United States Patent
Zeiser et al.

(10) Patent No.: US 12,491,248 B2
(45) Date of Patent: Dec. 9, 2025

(54) METHOD FOR GENERATING IMMUNOREGULATORY CELLS IN A BLOOD-DERIVED SAMPLE

(71) Applicant: Therakos Development Limited, Dublin (IE)

(72) Inventors: Robert Zeiser, Freiburg (DE); Petya Apostolova, Freiburg (DE); Justus Duyster, Freiburg (DE)

(*) Notice: Subject to any disclaimer, the term of this patent is extended or adjusted under 35 U.S.C. 154(b) by 537 days.

(21) Appl. No.: 17/787,836

(22) PCT Filed: Dec. 17, 2020

(86) PCT No.: PCT/EP2020/086733
§ 371 (c)(1),
(2) Date: Jun. 21, 2022

(87) PCT Pub. No.: WO2021/122969
PCT Pub. Date: Jun. 24, 2021

(65) Prior Publication Data
US 2023/0024405 A1    Jan. 26, 2023

(30) Foreign Application Priority Data
Dec. 20, 2019 (EP) .................... 19218724

(51) Int. Cl.
| | |
|---|---|
| *A61K 41/00* | (2020.01) |
| *A61K 40/11* | (2025.01) |
| *A61K 40/15* | (2025.01) |
| *A61K 40/22* | (2025.01) |
| *A61K 40/41* | (2025.01) |
| *A61P 37/00* | (2006.01) |
| *C12N 5/0783* | (2010.01) |

(52) U.S. Cl.
CPC .......... *A61K 41/0066* (2013.01); *A61K 40/11* (2025.01); *A61K 40/15* (2025.01); *A61K 40/22* (2025.01); *A61K 40/416* (2025.01); *A61P 37/00* (2018.01); *C12N 5/0646* (2013.01); *A61K 2239/31* (2023.05); *A61K 2239/38* (2023.05); *C12N 2529/10* (2013.01)

(58) Field of Classification Search
None
See application file for complete search history.

(56) References Cited

U.S. PATENT DOCUMENTS

| | | |
|---|---|---|
| 5,984,887 A | 11/1999 | Mclaughlin et al. |
| 5,985,914 A * | 11/1999 | Zeldis .................... A61P 13/10 514/451 |
| 2007/0098686 A1 | 5/2007 | Peritt et al. |

FOREIGN PATENT DOCUMENTS

| | | |
|---|---|---|
| CN | 1767839 A | 5/2006 |
| CN | 108578675 A | 9/2018 |
| JP | 3585487 B1 | 11/2004 |
| WO | 9902215 A1 | 1/1999 |

OTHER PUBLICATIONS

Jackson et al. Support Care Cancer 23, 1-3 (2015) (Year: 2015).*
McInnes L., et al., "UMAP: Uniform Manifold Approximation and Projection for Dimension Reduction," 2018, 63 pages.
Meinhardt K., et al., "Identification and Characterization of the Specific Murine NK Cell Subset Supporting Graft-Versus-Leukemia- and Reducing Graft-Versus-Host-Effects," Oncoimmunology 2015, vol. 4, 13 pages.
Motzer R.J., et al., "Nivolumab Plus Ipilimumab Versus Sunitinib in First-Line Treatment For Advanced Renal Cell Carcinoma: Extended Follow-Up of Efficacy and Safety Results from a Randomised, Controlled, Phase 3 Trial," The Lancet Oncology, 2019, vol. 20, No. 10, pp. 1370-1385.
Ni M., et al., "Shaping of CD56 (bri) Natural Killer Cells in Patients with Steroid-Refractory/Resistant Acute Graft-vs.-Host Disease via Extracorporeal Photopheresis," Frontiers in Immunology, 2019, vol. 10, No. 547, 17 pages.
Office Action for European Application No. 20833822.8, mailed on Jul. 5, 2023, 5 pages.
Olson J.A., et al., "NK Cells Mediate Reduction of GVHD by Inhibiting Activated, Alloreactive T Cells While Retaining GVT Effects," Blood, 2010, vol. 115, pp. 4293-4301.
Oray M., et al., "Long-Term Side Effects of Glucocorticoids," Expert Opinion on Drug Safety, 2016, vol. 15, No. 4, pp. 457-465.
Paparoupa M., et al., "Successful Treatment of an Immune-Mediated Colitis Induced by Checkpoint Inhibitor Therapy in a Patient with Advanced Melanoma," Case Reports in Gastroenterology, 2020, vol. 14, No. 3, pp. 554-560.
Perez-Ruiz E., et al., "Prophylactic TNF Blockade Uncouples Efficacy and Toxicity in Dual CTLA-4 and PD-1 Immunotherapy," Nature, May 2019, vol. 569, No. 7756, pp. 428-432.
Postow M.A., et al., "Immune-Related Adverse Events Associated with Immune Checkpoint Blockade," The New England Journal of Medicine, 2018, vol. 378, No. 2, pp. 158-168.

(Continued)

*Primary Examiner* — Daniel C Gamett
(74) *Attorney, Agent, or Firm* — Sterne, Kessler, Goldstein & Fox P.L.L.C.

(57) ABSTRACT

The present invention relates to a method comprising the steps of provision of a sample derived from a blood sample of a subject that has received a checkpoint-inhibitor therapy and is suspected of developing or has developed symptoms of immune-related adverse events (irAE), adding a photosensitizing agent to the sample, and subjecting the sample to irradiation, which preferably generates immunoregulatory NK cells in said sample. In embodiments, the photosensitizing agent is 8-methoxypsoralen and/or the irradiation is UVA irradiation. In another aspect, the invention relates to immunoregulatory NK cells obtained from a method comprising the steps of provision of a sample derived from an isolated blood sample of a subject, adding a photosensitizing agent to the sample, and subjecting the sample to irradiation. Furthermore, the invention encompasses immunoregulatory NK cells for use in the treatment and/or prevention of irAE in a subject that has received a checkpoint-inhibitor therapy.

20 Claims, 10 Drawing Sheets

(56) References Cited

OTHER PUBLICATIONS

Postow M.A., et al., "Nivolumab and Ipilimumab versus Ipilimumab in Untreated Melanoma," N. Engl. J. Med., May 21, 2015, vol. 372(21), pp. 2006-2017.

Puzanov I., et al., "Managing Toxicities Associated with Immune Checkpoint Inhibitors: Consensus Recommendations from the Society for Immunotherapy of Cancer (SITC) Toxicity Management Working Group," The Journal for ImmunoTherapy of Cancer, 2017, vol. 5, No. 1, 28 pages.

Reinisch W., et al., "Extracorporeal Photochemotherapy in Atients with Steroid-Dependent Crohn's Disease: A Prospective Pilot Study," Alimentary Pharmacology Therapeutics, 2001, vol. 15, No. 9, pp. 1313-1322.

Reinisch W., et al., "Extracorporeal Photopheresis (ECP) in Patients with Steroid-Dependent Crohn's Disease: An Open-Label, Multicenter, Prospective Trial," Inflammatory Bowel Disease, 2013, vol. 19, No. 2, pp. 293-300.

Ricciuti B., et al., "Immune Checkpoint Inhibitor Outcomes for Patients with Non-Small-Cell Lung Cancer Receiving Baseline Corticosteroids for Palliative versus Nonpalliative Indications," Journal of Clinical Oncology, 2019, vol. 37, No. 22, pp. 1927-1934.

Romee R., et al., "NK Cell CD16 Surface Expression and Function Is Regulated By a Disintegrin and Metalloprotease-17 (ADAM17)," Blood, 2013, vol. 121, pp. 3599-3608.

Ruggeri L., et al., "Effectiveness of Donor Natural Killer Cell Alloreactivity in Mismatched Hematopoietic Transplants," Science, 2002, vol. 295, pp. 2097-2100.

Schadendorf D., et al., "Efficacy and Safety Outcomes in Patients with Advanced Melanoma Who Discontinued Treatment with Nivolumab and Ipilimumab Because of Adverse Events: A Pooled Analysis of Randomized Phase II and III Trials," Journal of Clinical Oncology, 2017, vol. 35, No. 34, pp. 3807-3814.

Schwenck J., et al., "Cancer Immunotherapy Is Accompanied by Distinct Metabolic Patterns in Primary and Secondary Lymphoid Organs Observed by Non-Invasive In vivo 18F-FDG-PET," Theranostics, 2020, vol. 10, No. 2, pp. 925-937.

Spisek R., et al., "Maturation State of Dendritic Cells during the Extracorporeal Photopheresis and its Relevance for the Treatment of Chronic Graft-Versus-Host Disease," Transfusion, 2006, vol. 46, No. 1, pp. 55-65.

Trinh S., "Management of Immune-Related Adverse Events Associated with Immune Checkpoint Inhibitor Therapy: A Minireview of Current Clinical Guidelines," Asia-Pacific Journal of Oncology Nursing, Jun. 1, 2019, vol. 6, No. 2, p. 154.

Uygun V., et al., "Safety and Outcomes of Extracorporeal Photopheresis with the Therakos Cellex System for Graft-Versus-Host Disease in Pediatric Patients," Journal of Pediatric Hematology/Oncology, 2015, vol. 37, No. 3, pp. 209-214.

Wang L., et al., "Modulation of B Cells and Homing Marker on NK Cells Through Extracorporeal Photopheresis in Patients with Steroid-Refractory/Resistant Graft-Vs.-Host Disease Without Hampering Anti-Viral/Anti-Leukemic Effects," Frontiers in Immunology, 2018, vol. 9, No. 2207, 15 pages.

Wang Y., et al., "Fecal Microbiota Transplantation For Refractory Immune Checkpoint Inhibitor-Associated Colitis," Nature Medicine, 2018, vol. 24, No. 12, pp. 1804-18088.

Williams K.J., et al., "Corticosteroids for the Management of Immune-Related Adverse Events in Patients Receiving Checkpoint Inhibitors," Journal of Oncology Pharmacy Practice, Apr. 2019, vol. 25, No. 3, pp. 544-550.

Wolchok J.D., et al., "Overall Survival with Combined Nivolumab and Ipilimumab in Advanced Melanoma," The New England Journal of Medicine, 2017, vol. 377, pp. 1345-1356.

Zeiser R., et al., "Acute Graft-versus-Host Disease—Biologic Process, Prevention, and Therapy," The New England Journal of Medicine, 2017, vol. 377, pp. 2167-2179.

Cheung, V.T.F., and Brain, O., "Immunotherapy induced enterocolitis and gastritis—What to do and when?," Best Pract Res Clin Gastroenterol 48-49:101703, Elsevier, United Kingdom (Oct.-Dec. 2020).

Choi, J., and Lee, S.Y., "Clinical Characteristics and Treatment of Immune-Related Adverse Events of Immune Checkpoint Inhibitors," Immune Netw 20(1):e9, Korean Association of Immunologists, South Korea (Feb. 2020).

Abreu M.T., et al., "Extracorporeal Photopheresis for the Reatment of Refractory Crohn's Disease: Results of an Open-Label Pilot Study," Inflammatory Bowel Disease, 2009, vol. 15, No. 6, pp. 829-836.

Alcindor T., et al., "Immunomodulatory Effects of Extracorporeal Photochemotherapy in Patients with Extensive Chronic Graft-Versus-Host Disease," Blood, 2001, vol. 98, pp. 1622-1625.

Apostolova P., et al., "Extracorporeal Photopheresis for Colitis Induced by Checkpoint-Inhibitor Therapy," The New England Journal of Medicine, 2020, vol. 382, No. 3, pp. 294-296.

Arbour K.C., et al., "Impact of Baseline Steroids on Efficacy of Programmed Cell Death-1 and Programmed Death-Ligand 1 Blockade in Patients with Non-Small-Cell Lung Cancer," Journal of Clinical Oncology, 2018, vol. 36, No. 28, pp. 2872-2878.

Asai O., et al., "Suppression of Graft-Versus-Host Disease and Amplification of Graft-Versus-Tumor Effects by Activated Natural Killer Cells after Allogeneic Bone Marrow Transplantation," Journal of Clinical Investigation, 1998, vol. 101, pp. 1835-1842.

Bai X., et al., "Early Use of High-Dose-Glucocorticoid for the Management of IrAE is Associated with Poorer Survival in Patients with Advanced Melanoma Treated with Anti-PD-1 Monotherapy," Clinical Cancer Research, 2021, 8 pages.

Beck K.E., et al., "Enterocolitis in Patients with Cancer after Antibody Blockade of Cytotoxic T-Lymphocyte-Associated Antigen 4," Journal of Clinical Oncology, 2006, vol. 24, pp. 2283-2289.

Bergqvist V., et al., "Vedolizumab Treatment for Immune Checkpoint Inhibitor-Induced Enterocolitis," Cancer Immunology, Immunotherapy, 2017, vol. 66, No. 5, pp. 581-592.

Bertha M., et al., "Checkpoint Inhibitor-Induced Colitis: A New Type of Inflammatory Bowel Disease?," ACG Case Reports Journal, 2017, vol. 4, No. e112, 3 pages.

Besnier D.P., et al., "Treatment of Graft-Versus-Host Disease by Extracorporeal Photopheresis: A Pilot Study," Transplantation, 1997, vol. 64, No. 1, pp. 49-54.

Biagi E., et al., "Extracorporeal Photochemotherapy is Accompanied By Increasing Levels of Circulating CD4+CD25+GITR+Foxp3+ CD62L+ Functional Regulatory T-Cells in Patients with Graftersus—Host Disease," Transplantation, 2007, vol. 84, No. 1, pp. 31-39.

Bladon J., et al., "Extracorporeal Photopheresis Induces Apoptosis in the Lymphocytes of Cutaneous T-Cell LYmphoma and Graft-Versus-Host Disease Patients," British Journal of Haematology, 1999, vol. 107, No. 4, pp. 707-711.

Brahmer J.R., et al., "Management of Immune-Related Adverse Events in Patients Treated With Immune Checkpoint Inhibitor Therapy: American Society of Clinical Oncology Clinical Practice Guideline," Journal of Clinical Oncology, 2018, vol. 36, No. 17, pp. 1714-1768.

Brummelman J., et al., "Development, Application and Computational Analysis of High Dimensional Fluorescent Antibody Panels for Single-Cell Flow Cytometry," Nature Protocols, 2019, vol. 14, pp. 1946-1969.

Chen J., et al., "The Efficacy and Safety of Combined Immune Checkpoint Inhibitors (Nivolumab Plus Ipilimumab): A Systematic Review and Meta-Analysis," World Journal of Surgical Oncology, 2020, vol. 18, No. 1, 11 pages.

Cho A., "Extracorporeal Photopheresis—An Overview," Frontiers in Medicine, 2018, vol. 5, No. 236, 8 pages.

De Giglio A., et al., "Impact of Intercurrent Introduction of Steroids on Clinical Outcomes in Advanced Non-Small-Cell Lung Cancer (NSCLC) Patients under Immune—Checkpoint Inhibitors (ICI)," Cancers (Basel), 2020, vol. 12, No. 10, 11 pages.

Diana P., et al., "Emerging Role of Vedolizumab in Managing Refractory Immune Checkpoint Inhibitor-Induced Enteritis," ACG Case Reports Journal, 2018, vol. 5, No. e17, 3 pages.

Dougan M., et al., "Multinational Association of Supportive Care in Cancer (MASCC) 2020 Clinical Practice Recommendations for the Management of Severe Gastrointestinal and Hepatic Toxicities from Checkpoint Inhibitors," Supportive Care in Cancer, 2020, vol. 28, No. 12, pp. 6129-6143.

(56) References Cited

OTHER PUBLICATIONS

Drakaki A., et al., "Association of Systemic Corticosteroids with Overall Survival in Patients Receiving Cancer Immunotherapy for Advanced Melanoma, Non-Small Cell Lung Cancer Or Urothelial cancer In Routine Clinical Practice," Annals of Oncology, 2019, vol. 30, pp. xi16-xi32.

Eggermont A.M.M., et al., "Association Between Immune-Related Adverse Events and Recurrence-Free Survival Among Patients With Stage III Melanoma Randomized to Receive Pembrolizumab or Placebo: A Secondary Analysis of a Randomized Clinical Trial," JAMA Oncology, 2020, vol. 6, No. 4, pp. 519-527.

Gatza E., et al., "Extracorporeal Photopheresis Reverses Experimental Graft-Versus-Host Disease through Regulatory T Cells," Blood, 2008, vol. 112, No. 4, pp. 1515-1521.

Gerber A., et al., "Investigation of Annexin V Binding to Lymphocytes Tier Extra Corporeal Photoimmunotherapy as an Early Marker of Apoptosis," Dermatology, 2000, vol. 201, No. 2, pp. 111-117.

Gettinger S.N., et al., "Nivolumab Plus Lpilimumab Vs Nivolumab For Previously Treated Patients with Stage IV Squamous Cell Lung Cancer: The Lung-MAP S14001 Phase3 Randomized Clinical Trial," JAMA Oncology, 2021, vol. 7, No. 9, pp. 1368-1377.

Goodier M.R., et al., "Sustained Immune Complex-Mediated Reduction in CD16 Expression after Vaccination Regulates NK Cell Function," Frontiers in Immunology, 2016, vol. 7, No. 384, 13 pages.

Gorgun G., et al., "Immunologic Mechanisms of Extracorporeal Photochemotherapy in Chronic Graftersus—Host Disease," Blood, 2002, vol. 100, No. 3, pp. 941-947.

Greinix H.T., et al., "Extracorporeal Photochemotherapy in the Treatment of Severe Steroid-Refractory Acute Graft-Versus-Host Disease: A Pilot Study," Blood, 2000, vol. 96, No. 7, pp. 2426-2431.

Greinix H.T., et al., "The Effect of Intensified Extracorporeal Photochemotherapy on Long-Term Survival in Patients with Severe Acute Graft-Versus-Host Disease," Haematologica, 2006, vol. 91, No. 3, pp. 405-408.

Haanen J., et al., "Management of Toxicities from Immunotherapy: ESMO Clinical Practice Guidelines for Diagnosis, Treatment and Follow-Up," Annals of Oncology, 2018, vol. 29, No. 4, pp. iv264-iv266.

Hannani D., et al., "Photochemotherapy Induces the Apoptosis of Monocytes without Impairing their Function," Transplantation, 2010, vol. 89, No. 5, pp. 492-499.

Hodi F.S., et al., "Improved Survival with Ipilimumab in Patients with Metastatic Melanoma," The New England Journal of Medicine, Aug. 19, 2010, vol. 363, No. 8, pp. 711-723.

Hutchinson J.A., et al., "Virus-Specific Memory T Cell Responses Unmasked by Immune Checkpoint Blockade Cause Hepatitis," Nature Communications, 2021, vol. 12, No. 1, 15 pages.

Iniesta P., et al., "An Early Increase of CD56 (Bright) Natural Ciller Subset as Dominant Effect and Predictor of Response to Extracorporeal Photopheresis for Graft-Versus-Host Disease," Transfusion, 2018, vol. 58, No. 12, pp. 2924-2932.

Iyoda T., et al., "Resolution of Infliximab-Refractory Nivolumab-Induced Acute Severe Enterocolitis after Cyclosporine Treatment in a Patient with Non-Small Cell Lung Cancer," American Journal of Case Reports, 2018, vol. 19, pp. 360-364.

James E.R., "The Etiology of Steroid Cataract," Journal of Ocular Pharmacology and Therapeutics, 2007, vol. 23, No. 5, pp. 403-420.

Johncilla M., et al., "Lpilimumab-Associated Hepatitis: Clinicopathologic Characterization in a Series of 11 Cases," The American Journal of Surgical Pathology, 2015, vol. 39, pp. 1075-1084.

Kikuchi H., et al., "A Case of Nivolumab-Associated Colitis, Which Relapsed After Mucosal Healing and Was Then Successfully Treated With Mesalazine," Immunological Medicine, Mar. 2019, vol. 42, No. 1, pp. 39-44.

Klein G.L., "The Effect of Glucocorticoids on Bone and Muscle," Osteoporos Sarcopenia, 2015, vol. 1, No. 1, pp. 39-45.

Knobler R.M., et al., "Extracorporeal Bhotochemotherapy for the Treatment of Systemic Lupus Erythematosus. A Pilot Study," Arthritis Rheumatology, 1992, vol. 35, No. 3, pp. 319-324.

Kooshkaki O., et al., "Combination of Ipilimumab and Nivolumab in Cancers: From Clinical Practice to Ongoing Clinical Trials," International Journal of Molecular Sciences, 2020, vol. 21, No. 12, 28 pages.

Larkin J., et al., "Combined Nivolumab and Lpilimumab or Monotherapy in Untreated Melanoma," The New England Journal of Medicine, 2015, vol. 373, pp. 23-34.

Larkin J., et al., "Five-Year Survival with Combined Nivolumab and Ipilimumab in Advanced Melanoma," The New England Journal of Medicine. 2019, vol. 381, No. 16, pp. 1535-1546.

Lebbe C., et al., "Evaluation of Two Dosing Regimens for Nivolumab in Combination with Lpilimumab in Patients with Advanced Melanoma: Results from the Phase IIIb/IV Checkmate 511 Trials," Journal of Clinical Oncology, 2019, vol. 37, No. 11, pp. 867-875.

Lorenz K., et al., "Modulation of Lymphocyte Subpopulations by Extracorporeal Photopheresis in Patients with Acute Graft-Versus-Host Disease or Graft Rejection," Leukemia Lymphoma, 2015, vol. 56, No. 3, pp. 671-675.

Luo J., et al., "Beyond Steroids: Immunosuppressants in Steroid-Refractory or Resistant Immune-Related Adverse Events," Journal of Thoracic Oncology, 2021, 7 pages.

Ma C., et al., "Pharmacological Interventions for the Prevention and Treatment of Immune Checkpoint Inhibitor-Associated Enterocolitis: A Systematic Review," Digestive Diseases and Sciences, Mar. 26, 2021, vol. 67, No. 4, pp. 1128-1155.

Maeda A., et al., "Experimental Extracorporeal Photopheresis Inhibits the Sensitization and Effector Phases of Contact Hypersensitivity via Two Mechanisms: Generation of IL-10 and Nduction of Regulatory T Cells," Journal of Immunology, 2008, vol. 181, No. 9, pp. 5956-5962.

Maeda A., et al., "Intravenous Infusion of Syngeneic Apoptotic Cells by Photopheresis Induces Antigen-Specific Regulatory T Cells," Journal of Immunology, 2005, vol. 174, No. 10, pp. 5968-5976.

Maeda A., et al., "Phenotypic and Functional Characterization of Ultraviolet Radiationnduced Regulatory T Cells," Journal of Immunology, 2008, vol. 180, No. 5, pp. 3065-3071.

Cheng, M., et al., "NK Cell-Based Immunotherapy for Malignant Diseases," Cellular & Molecular Immunology 10(3):230-252, Nature Publishing Group, China (May 2013).

Edelson, R., et al., "Treatment of Cutaneous T-Cell Lymphoma by Extracorporeal Photochemotherapy," New England Journal of Medicine 316(6):297-303, Massachusetts Medical Society, United States (Feb. 1987).

Kubo, T., et al., "Low-Dose Interleukin-2 Therapy Enhances Cytotoxicity of $CD56^{bright}$ NK Cells in Patients with Chronic GVHD," Blood 132 (Supplement 1):606, 3 pages, American Society of Hematology, United States (Nov. 2018).

Mckenna, K.E., et al., "Evidence-Based Practice of Photopheresis 1987-2001: A Report of a Workshop of the British Photodermatology Group and the U.K. Skin Lymphoma Group," British Journal of Dermatology 154(1):7-20, Wiley-Blackwell, United Kingdom (Jan. 2006).

Nand, S., "Therapeutic Apheresis in Malignancy," Therapeutic Apheresis 1(1):29-32, Blackwell Science, United States (Feb. 1997).

Peritt, D., "Potential Mechanisms of Photopheresis in Hematopoietic Stem Cell Transplantation," Biology of Blood and Marrow Transplantation 12(1)(Supplement 2):7-12, American Society for Transplantation and Cellular Therapy, United States (Jan. 2006).

\* cited by examiner

METHOD FOR GENERATING IMMUNOREGULATORY CELLS IN A BLOOD-DERIVED SAMPLE

CROSS REFERENCE TO RELATED APPLICATIONS

This application is a U.S. national phase application of PCT Application No. PCT/EP2020/086733, filed Dec. 17, 2020, which claims priority to EP Application No. 19218724.3, filed Dec. 20, 2019, the disclosures of which are incorporated herein by reference.

DESCRIPTION

The present invention relates to a method comprising the steps of provision of a sample derived from a blood sample of a subject that has received a checkpoint-inhibitor therapy and is suspected of developing or has developed symptoms of immune-related adverse events (irAE), adding a photosensitizing agent to the sample, and subjecting the sample to irradiation, which preferably generates immunoregulatory NK cells in said sample. In embodiments, the photosensitizing agent is 8-methoxypsoralen and/or the irradiation is UVA irradiation. In another aspect, the invention relates to immunoregulatory NK cells obtained from a method comprising the steps of provision of a sample derived from an isolated blood sample of a subject, adding a photosensitizing agent to the sample, and subjecting the sample to irradiation. Furthermore, the invention encompasses immunoregulatory NK cells for use in the treatment and/or prevention of irAE in a subject that has received a checkpoint-inhibitor therapy.

BACKGROUND OF THE INVENTION

Immune checkpoints are regulatory molecules of the immune system and play an important role in maintaining immune homeostasis and self-tolerance. The first immune checkpoints that were identified include cytotoxic T-lymphocyte protein-4 (CTLA-4) and programmed cell death protein-1 (PD-1). CTLA-4 is expressed on the surface of T cells, binds to B7-1 (CD80) or B7-2 (CD86) molecules on antigen-presenting cells, and functions as a negative regulator of T cells. PD-1 also has a negative effect on T cell activity through interactions with its ligands, including programmed death ligand-1 (PD-L1) and programmed death ligand-2 (PD-L2). Unlike CTLA-4, PD-1 is not only found on T cells but is also broadly expressed on many immunologic cells, including B cells and natural killer cells. In healthy individuals, the surface expression of both CTLA-4 and PD-1 is tightly and dynamically regulated.

During the development of cancer, malignant cells inhibit the immune response by activating immune checkpoints. Previous studies have shown that PD-L1 is expressed in a wide range of cancers. In the tumor microenvironment, PD-L1 expressed by cancerous cells interacts with PD-1 on the surface of T cells to inhibit effector function of T cells. In addition, a number of studies have demonstrated that high tumor expression of PD-L1 is significantly correlated with poor prognosis of carcinoma. These studies suggest that there is a therapeutic effect of PD-1 signaling pathway blockade in cancer.

Recent clinical trials have revealed that several anti-PD-1 and anti-PD-L1 immune checkpoint inhibitors (ICIs) are effective in a variety of cancers, such as melanoma, non-small cell lung carcinoma, renal cell carcinoma, and head and neck cancer. Additional clinical trials are currently underway to expand the indication for ICIs. To date, The U.S. Food and Drug Administration (FDA) has approved three anti-PD-1 antibodies, nivolumab, pembrolizumab, and cemiplimab, and three anti-PD-L1 inhibitors, atezolizumab, avelumab, and durvalumab, for the treatments of different types of cancer.

As the use of ICIs increases, the adverse events related to this class of drugs have become an important issue. ICIs have a different toxicity profile than conventional cytotoxic chemotherapy. The side effects associated with the increased activity of the immune system by ICIs, known as immune-related adverse events (irAEs), can affect multiple organs of the body including skin, gastrointestinal tract, endocrine system, liver, lung, nervous systems, and musculoskeletal systems.

Combined immune checkpoint-inhibitor therapy, for example with anti-CTLA4 and anti-PD-1 antibodies is an efficient first-line treatment for malignant melanoma. However, approximately 50% of the patients develop serious immune-related adverse events (irAE)[1,2]. Autoimmune colitis occurs in 20% of the cases and can become corticosteroid-refractory[3].

In summary, although checkpoint-inhibitor therapy, in particular with anti-CTLA4 and anti-PD-1 antibodies, is an effective treatment for multiple forms of cancer, in particular malignant melanoma, the treatment can be associated with substantial side effects that may result from the activation of the immune system due to checkpoint inhibitor treatment. Such side effects can result in autoimmune reactions and manifest in different clinical symptoms and may be summarized as irAE. A prominent irAE is autoimmune colitis. The side effects of the treatment, such as autoimmune reactions, in particular autoimmune colitis can persist even after the checkpoint inhibitor treatment has been stopped.

Accordingly, there is a need in the art for alternative or improved means for treating immune-related adverse events, such as autoimmune reactions and in particular autoimmune colitis in a patient that has received checkpoint-inhibitor therapy.

SUMMARY OF THE INVENTION

In light of the prior art the technical problem underlying the present invention is to provide improved or alternative means for treating and/or preventing immune-related adverse events, such as autoimmune reactions and in particular autoimmune colitis in a patient that has received checkpoint-inhibitor therapy.

This problem is solved by the features of the independent claims. Preferred embodiments of the present invention are provided by the dependent claims.

In a first aspect, the invention relates to a method comprising the steps of
provision of a sample derived from a blood sample of a subject that has received a checkpoint-inhibitor therapy and is suspected of developing or has developed symptoms of immune-related adverse events (irAE),
adding a photosensitizing agent to the sample and subjecting the sample to irradiation.

The present invention is based on the entirely surprising finding that patients that have received a checkpoint-inhibitor therapy, for example due to a cancerous disease, which led to irAE, such as in particular autoimmune colitis, can be effectively treated by applying ECP. The ECP that was used in the examples basically corresponds to a method of adding a photosensitizing agent to a blood-derived sample of an irAE patient and subjecting the sample to irradiation. Surprisingly, it was found that preforming this method on a blood sample, such as in particular a blood sample comprising mononuclear cells (MNCs) leads to the generation of immunoregulatory NK cells in said sample. In this context, "generation of" immunoregulatory NK cells is understood as inducing or inducing the formation of such cells in the sample. In other words, cells that are comprised in the sample differentiate into or adopt a phenotype of immunoregulatory NK cells.

It was found that the sample resulting from the method of the invention and in particular the induced immunoregulatory NK cells comprised by the sample are useful for the treatment of irAE patients. It surprisingly could be shown that administration of such a sample or cells comprised in such a sample that underwent the method of the invention to a subject that has received a checkpoint-inhibitor therapy is effective in preventing the occurrence of irAE and even in the treatment of irAE that is already established in the subject. Importantly, the method of the invention can be performed on a sample of the same subject that has received the checkpoint inhibitor therapy. Therefore, the cells or the sample resulting from the method of the invention can be administered to the same subject that served as a blood donor and therefore the resulting sample can represent an autologous cell therapy.

As used herein, the term "subject that has received checkpoint-inhibitor therapy" includes subjects that are currently under ongoing checkpoint-inhibitor therapy, or subjects that have received a checkpoint-inhibitor therapy that was discontinued, for example after irAE symptoms occurred.

It was completely unexpected, that such a cell therapy using a sample or cells resulting from the method of the invention is even effective for irAE patients that are refractory to other immunosuppressive therapies, such as steroids or anti-TNF antibodies, and which continue to show symptoms of or still suffer from irAE after checkpoint-inhibitor treatment was discontinued.

As shown in the examples, the positive effect and the efficacy of the administration of a sample that underwent the method of the invention may be at least partially due to a modulation of NK cell function of the NK cells comprised in the sample, wherein said modulation is a result of the irradiation in presence of a photosensitizing agent. Therefore, the present invention also encompasses immunomodulatory NK cells for use in the treatment of and/or prevention of immune-related adverse events (irAE) in a subject that has received a checkpoint-inhibitor therapy. Preferably, the immunomodulatory NK cells were generated by subjecting blood or MNCs or NK cells from a person, preferably a subject that has received a checkpoint-inhibitor therapy and is suspected of developing or has developed irAE, to the method of the present invention, and are subsequently used for treating a subject that has received a checkpoint-inhibitor therapy and is suspected of developing or has developed irAE, which is preferably the donor.

In a further aspect, the invention relates to immunoregulatory NK cells obtained from a method comprising the steps of
provision of a sample derived from an isolated blood sample of a subject,
adding a photosensitizing agent to the sample, and
subjecting the sample to irradiation.

This aspect of the invention is based on the observation that NK cells comprised in a blood-derived sample that underwent irradiation after adding a photosensitizing adopt an immunoregulatory phenotype that is advantageous when using the resulting cells in the treatment and/or prevention of irAE. Such advantageous and beneficial properties have so far not been observed for any other NK cells in this context.

Preferably, the subjects of the invention are human. Preferably, the blood samples and cells of the invention are human.

In preferred embodiments, the blood sample used for generating the immunoregulatory NK cells of the invention is from a subject that has received a checkpoint-inhibitor therapy and is suspected of developing or has developed symptoms of immune-related adverse events (irAE). This embodiment is particularly advantageous, since the cells are autologous to said patient and there will be no adverse events that can occur upon transplantation of heterologous cells.

A further aspect of the invention is directed to immunoregulatory NK cells for use in the treatment and/or prevention of immune-related adverse events (irAE) in a subject that has received a checkpoint-inhibitor therapy. This includes subjects that are currently under ongoing checkpoint-inhibitor therapy, or subjects that have received a checkpoint-inhibitor therapy that was discontinued, for example after irAE symptoms occurred.

Preferably, the immunoregulatory NK cells for use in such a treatment or prevention have been generated by adding a photosensitizing agent to a sample derived from a blood sample of a human subject and subjecting the sample to irradiation.

Adding a photosensitizing agent to the blood-derived sample and subjecting the sample to irradiation generates or induces (the formation of) immunoregulatory NK cells in said sample.

In embodiments, the photosensitizing agent is 8-methoxypsoralen. Furthermore, in embodiments the irradiation is UVA irradiation. In preferred embodiments the photosensitizing agent is 8-methoxypsoralen and the irradiation is UVA irradiation.

In the context of the invention, irradiation is preferably preformed by means of an extracorporeal photopheresis (ECP) system. Irradiation of the blood sample can be performed using any suitable system or irradiation device known to the skilled person.

In embodiments, the method of the invention is performed in vitro or ex vivo. As used herein, the terms in vivo and ex vivo are used synonymously. In the context of the present invention, the terms relate to a method that is performed on a blood-derived sample that has been removed from the human body, wherein the method of the invention is performed on the blood-derived sample outside the human body. To this end, blood of a donor subject is taken out of the body, meaning out of the physiological circulatory system. As used herein, an "isolated blood sample" is a sample of blood (meaning a certain volume of blood) that is removed from the circulatory system of the donor to a location outside the body of the person.

Such an isolated blood sample can be subjected or introduced into an extracorporeal photopheresis (ECP) system or an apheresis system for performing at least certain steps of the method of the invention. Therein, such a system can be an online system that is in a fluid connection with the blood circulatory system of the subject. In alternative embodiments, the method can be performed offline, wherein the blood-derived sample that is subjected to irradiation is disconnected from the circulatory system of the donor subject.

Accordingly, in embodiments, the method of the invention is an in vitro method. In embodiments of the method of the invention, the blood sample is an isolated blood sample. In embodiments, the method is an in vitro method and the blood sample is an isolated blood sample.

As used herein the term "blood sample" comprises all kinds of blood-derived samples, including blood-cell samples such as MNC samples that are generated from blood.

In embodiments of the invention, the subject (the blood donor and/or recipient of cells) shows symptoms of or suffers from irAE. In further embodiments, the subject has received checkpoint-inhibitor therapy, but the checkpoint-inhibitor therapy was discontinued after symptoms and/or manifestation of irAE occurred in said subject. In embodiments, symptoms and/or manifestation of irAE occurred in the subject after the checkpoint-inhibitor therapy was discontinued. In embodiments, symptoms and/or manifestation of irAE were maintained after the checkpoint-inhibitor therapy was discontinued.

In embodiments of the invention, where the subject that has received a checkpoint-inhibitor therapy and is suspected of developing or has developed symptoms of irAE serves as a blood donor, provision and/or isolation of the blood sample can occur at any of the time points described in the embodiments above. For example, sample isolation can occur prior to or after development of irAE symptoms. Furthermore, sample isolation can occur during checkpoint-inhibitor therapy or after discontinuation of said therapy.

In preferred embodiments of the invention, the sample resulting from the method of the invention or the NK cells for use according to the present invention are administered to the subject while checkpoint-inhibitor therapy is ongoing.

In preferred embodiments, sample isolation occurs during ongoing checkpoint-inhibitor therapy, either before or after occurrence of irAE symptoms. The sample or cells resulting from the method of the examples can be used preventively or therapeutically by administering the sample/cells to the subject during ongoing checkpoint-inhibitor therapy. Accordingly, in preferred embodiments of the invention, the subject that has received checkpoint-inhibitor therapy can receive immunoregulatory NK cells, which are preferably autologous and have been generated by irradiating a blood-derived sample according to a method described herein, while checkpoint-inhibitor therapy is ongoing. Such embodiments are particularly advantageous, since checkpoint-inhibitor therapy, such as an anti-cancer checkpoint inhibitor therapy, can be maintained, while the patient receives cells of the invention and/or cells resulting from the method of the invention.

Accordingly, in such embodiments a checkpoint-inhibitor therapy can be administered to the subject for a longer period, since the administration of the irradiated cells either prevents the occurrence of irAE or ameliorates irAE so that the checkpoint-inhibitor therapy can be continued. It could surprisingly be shown that administration of such cells resulting from a method of the invention, in particular immunomodulatory NK cells of the invention, does not interfere with the anti-cancer response of the subject to the checkpoint-inhibitor therapy. This represents an important advantage in comparison to known treatments/preventive measures of irAE, in particular administration of immunosuppressive drugs, such as corticosteroids. It surprisingly turned out that performing ECP did not notably alter the anti-cancer effect of checkpoint-inhibitor therapy, while parallel administration of glucocorticoids (specific class of corticosteroids), in particular prednisolone, resulted in a worse outcome, indicating an reduced effectivity of the checkpoint-inhibitor treatment.

Furthermore, in embodiments where a (human) blood-derived sample that underwent a method of adding a photosensitizing agent to the sample and subjecting the sample to irradiation is used in the treatment and/or prevention of irAE in a subject that has received a checkpoint-inhibitor therapy, irrespective of the source of the blood-derived sample (autologous or heterologous), the administration of the sample or cells resulting from such a method can occur, for example, prior to or after development of irAE symptoms, and/or during the checkpoint-inhibitor therapy or after discontinuation of the checkpoint-inhibitor therapy.

In embodiments of the invention, the irAE (of a blood-donor and/or of recipient of cells) comprise symptoms of an autoimmune disease and/or is caused by an autoimmune reaction. In preferred embodiments, the irAE comprise or are autoimmune colitis.

In embodiments, the irAE comprise at least one irAE selected from the group comprising autoimmune colitis, autoimmune hepatitis, autoimmune thyroiditis and autoimmune dermatitis.

In embodiments, the irAE comprise at least one irAE selected from the group comprising immune checkpoint inhibitor-related colitis, immune checkpoint inhibitor-related hepatitis, immune checkpoint inhibitor-related thyroiditis and immune checkpoint inhibitor-related dermatitis.

In embodiments, the subject (blood-donor and/or of recipient of cells) suffers from cancer, such as malignant melanoma or another cancer treatable by checkpoint-inhibitor therapy.

In embodiments, the subject is receiving immunosuppressive drugs, such as steroids, corticosteroid, cyclosporine and/or anti-TNF antibodies (for example infliximab) and/or is refractory to immunosuppressive drugs.

It was entirely surprising, that administration of cells that resulted from the methods described herein, such as immunoregulatory NK cells, have a therapeutic effect on irAE patients that are refractory to immunosuppressive drugs that have been administered for treating the irAE symptoms. For such patients, there is no effective treatment available for ameliorating irAE symptoms and the present invention therefore represents a completely unexpected possibility of treating irAE in these patients.

In embodiments, the checkpoint-inhibitor therapy comprises administration of at least one of anti-CTLA4 antibodies and anti-PD-1 antibodies.

In embodiments, the immunoregulatory NK cells for use in the treatment and/or prevention of irAE in a subject that has received a checkpoint-inhibitor therapy are autologous with respect to said subject. In alternative embodiment, the NK cells may be heterologous with respect to said subject.

In embodiments, the immunoregulatory NK cells for use according to the present invention are administered upon occurrence of irAE symptoms. In embodiments, the cells are administered 1, 2, 3, 4, 5, 6 or 7 days or 1, 2, 3, 4, 5, 6, 7, 8, 9, 10, 12, 14, 16, 18, 20, 22, 24, 26, 28, 30, 35, 40, 45 or 50 weeks after occurrence of irAE symptoms. In embodiments, the immunoregulatory NK cells are administered during checkpoint-inhibitor therapy is ongoing or after the checkpoint-inhibitor therapy was discontinued.

In embodiments, the immunoregulatory NK cells are administered are administered at least once to the subject, preferably at least twice, preferably on consecutive days. Accordingly, the subject may receive more than one dose of NK cells, wherein preferably not more than one dose per day is administered. In further embodiments, the subject receives at least 2, 3, 4 or 5 dosages of NK cells of the invention. In embodiments, the immunoregulatory NK cells of the invention are administered to the subject at least every 8 weeks, preferably every 2-4 weeks.

Each optional or preferred feature of the invention that is disclosed or described in the context of one aspect of the invention is herewith also disclosed in the context of the other aspects of the invention described herein.

Furthermore, the invention also relates to the following embodiments:

1. An extracorporeal photopheresis (ECP) system for use in the treatment and/or prevention of immune-related adverse events (irAE) in a subject that has received a checkpoint-inhibitor therapy, wherein ECP is preferably performed with administration of 8-Methoxypsoralen.

The present invention is based on the entirely surprising finding that patients that have received a checkpoint-inhibitor therapy, for example due to a cancerous disease, which led to irAE, such as in particular autoimmune colitis, can be effectively treated by applying ECP. This is even true for patients that are refractory to other immunosuppressive therapies, such as steroids or anti-TNF antibodies, and which continue to show symptoms of or still suffer from irAE after checkpoint-inhibitor treatment was discontinued.

Surprisingly, it turned out that the positive effect and the efficacy of ECP treatment resulted in particular from the modulation of NK cell function after ECP. Accordingly, the present invention in particular also relates to immunomodulatory NK cells for use in the treatment of and/or prevention of immune-related adverse events (irAE) in a subject that has received a checkpoint-inhibitor therapy, wherein the immunomodulatory NK cells were generated by subjecting blood or MNCs or NK cells from a person, preferably the subject of the invention, to an ECP treatment.

2. ECP system for use according to the invention, wherein the ECP system is an online ECP system.
3. ECP system for use according to the invention, wherein the ECP system is an offline ECP system.
4. ECP system for use according to the invention, wherein the subject shows symptoms of or suffers from irAE.
5. ECP system for use according to the invention, wherein the checkpoint-inhibitor therapy was discontinued after symptoms and/or manifestation of irAE occurred in said subject.
6. ECP system for use according to the invention, wherein symptoms and/or manifestation of irAE occurred after the checkpoint-inhibitor therapy was discontinued.
7. ECP system for use according to the invention, wherein symptoms and/or manifestation of irAE were maintained after the checkpoint-inhibitor therapy was discontinued.
8. ECP system for use according to any the invention, wherein the ECP treatment is initiated upon occurrence of irAE symptoms.
9. ECP system for use according to the invention, wherein the ECP treatment is initiated 1, 2, 3, 4, 5, 6 or 7 days or 1, 2, 3, 4, 5, 6, 7, 8, 9, 10, 12, 14, 16, 18, 20, 22, 24, 26, 28, 30, 35, 40, 45 or 50 weeks after occurrence of irAE symptoms.
10. ECP system for use according to any the invention, wherein ECP treatment is initiated during checkpoint-inhibitor therapy is ongoing or after the checkpoint-inhibitor therapy was discontinued.
11. ECP system for use according to the invention, wherein ECP treatment comprises at least 1, preferably at least 2 cycles of ECP preferably on consecutive days.
12. ECP system for use according to the invention, wherein ECP treatment is performed at least 2, 3, 4 or 5 times.
13. ECP system for use according to the invention, wherein ECP treatment is performed at least every 8 weeks, preferably every 2-4 weeks.
14. ECP system for use according to the invention, wherein the irAE comprise symptoms of an autoimmune disease.
15. ECP system for use according to the invention, wherein the irAE is caused by an autoimmune reaction.
16. ECP system for use according to the invention, wherein the irAE comprise at least one irAE selected from the group comprising autoimmune colitis, autoimmune hepatitis, autoimmune thyroiditis and autoimmune dermatitis.
17. ECP system for use according to the invention, wherein the irAE comprise at least one irAE selected from the group comprising immune checkpoint inhibitor-related colitis, immune checkpoint inhibitor-related hepatitis, immune checkpoint inhibitor-related thyroiditis and immune checkpoint inhibitor-related dermatitis.
18. ECP system for use according to the invention, wherein the irAE comprise autoimmune colitis.
19. ECP system for use according to the invention, wherein the irAE is autoimmune colitis.
20. ECP system for use according to the invention, wherein the subject is a human.
21. ECP system for use according to the invention, wherein the subject suffers from cancer, such as malignant melanoma or another cancer treatable by checkpoint-inhibitor therapy.
22. ECP system for use according to the invention, wherein the subject is receiving immunosuppressive drugs, such as steroids, corticosteroid, cyclosporine and/or anti-TNF antibodies (for example infliximab).
23. ECP system for use according to the invention, wherein the subject is refractory to immunosuppressive drugs, such as steroids, corticosteroid, cyclosporine and/or anti-TNF antibodies (for example infliximab).
24. ECP system for use according to the invention, wherein the checkpoint-inhibitor therapy comprises administration of at least one of anti-CTLA4 antibodies and anti-PD-1 antibodies.
25. ECP system for use according to the invention, wherein the ECP system is used for performing blood irradiation therapy.
26. ECP system for use according to the invention, wherein the ECP system comprises immunomodulatory molecules, preferably coupled to a membrane of the ECP system, wherein the immunomodulatory molecules contact immune cells of the subject.
27. In vitro method comprising the steps of
provision of a sample derived from an isolated blood sample of a subject that has received a checkpoint-inhibitor therapy and is suspected of developing or has developed symptoms of immune-related adverse events (irAE),
subjecting said sample to extracorporeal photopheresis.
28. Method of treating a subject that has received a checkpoint-inhibitor therapy and is suspected of developing or has developed symptoms of immune-related adverse events (irAE), the method comprising subjecting said subject to an extracorporeal photopheresis (ECP) therapy (ECP), such as blood irradiation therapy by means of an ECP system.

29. Immunoregulatory NK cells for use in the treatment and/or prevention of immune-related adverse events (irAE) in a subject that has received a checkpoint-inhibitor therapy.
30. Immunoregulatory NK cells for use according to the invention, wherein the immunoregulatory NK cells have been generated by subjecting a human blood sample or cells comprised in a human blood sample to extracorporeal photopheresis.
31. Immunoregulatory NK cells for use according to the invention, wherein the NK cells are autologous or heterologous with respect to said subject.
32. Immunoregulatory NK cells for use according to the invention, wherein the NK cells are administered to said subject intravenously.
33. Immunoregulatory NK cells for use according to the invention, wherein the NK cells are isolated from the human blood sample prior to or after subjection to extracorporeal photopheresis.

All features disclosed in the context of the ECP system for use in the treatment and/or prevention of immune-related adverse events (irAE) in a subject that has received a checkpoint-inhibitor therapy of the invention also relate to and are herewith disclosed also in the context of the in vitro method of the invention, the method of treatment of the invention and the NK cells for use in the treatment and/or prevention of immune-related adverse events (irAE) in a subject that has received a checkpoint-inhibitor therapy of the invention, and vice versa.

DETAILED DESCRIPTION OF THE INVENTION

All cited documents of the patent and non-patent literature are hereby incorporated by reference in their entirety.

Disclosed herein are methods comprising the steps of provision of a sample derived from a blood sample of a subject, preferably a subject that has received a checkpoint-inhibitor therapy and is suspected of developing or has developed symptoms of immune-related adverse events (irAE), adding a photosensitizing agent to the sample and subjecting the sample to irradiation. Irradiation of the blood sample can be performed using any suitable system or irradiation device known to the skilled person. Preferably, irradiation is performed by means of an extracorporeal photopheresis (ECP) system.

The present invention also relates to an extracorporeal photopheresis (ECP) system for use in the treatment and/or prevention of immune-related adverse events (irAE) in a subject that has received a checkpoint-inhibitor therapy, wherein ECP is preferably performed with administration of 8-Methoxypsoralen.

Irradiation and Extracorporeal Photopheresis (ECP)

Photopheresis, or extracorporeal photopheresis or ECP, is a form of apheresis and photodynamic therapy in which blood is treated with a photosensitizing agent and subsequently irradiated with specified wavelengths of light to achieve an effect. For example, buffy coat (WBC+platelets) can be separated from whole blood, chemically treated with 8-methoxypsoralen (instilled into collection bag or given per os in advance), exposed to ultraviolet light (UVA), and returned to the patient. Activated 8-methoxypsoralen cross-links DNA in exposed cells, ultimately resulting apoptosis of nucleated cells. The photochemically damaged T-cells returned to the patient appear to induce cytotoxic effects on T-cell formation.

Photopheresis involving 8-methoxypsoralen was first described in a 1987 New England Journal of Medicine publication (Edelson, R, et al. (1987). "*Treatment of cutaneous T-cell lymphoma by extracorporeal photochemotherapy. Preliminary results*". New England Journal of Medicine. 316 (6): 297-303.). Photopheresis is currently standard therapy approved by the U.S. Food and Drug Administration (FDA) for cutaneous T-cell lymphoma. Evidence suggests that this treatment might be effective in the treatment of graft-versus-host disease. Photopheresis has also been used successfully in the treatment of epidermolysis bullosa acquisita when all other treatments have been ineffective.

ECP as used herein comprises blood irradiation therapy. In embodiments, ECP and ECP systems of the invention relates to blood irradiation therapy and systems for blood irradiation therapy. In embodiments of the invention, ECP relates to ECP with exception of blood irradiation therapy.

Blood irradiation therapy is a procedure in which the blood is exposed to low level red light (often laser light) for therapeutic reasons. Blood irradiation therapy can be administered in three ways. Extracorporeally, drawing blood out and irradiating it in a special cuvette. This method is used for the ultraviolet (UV) blood irradiation (UVBI) by UV lamps. The laser light is monochromatic, i.e. it has such a wavelength that allows you to bring light into the optical fiber and carry out irradiation intravenously through a catheter in a vein. This method is more simple and effective. Blood irradiation therapy is also administered externally through the skin on the projection of large blood vessels.

Intravenous or intravascular laser blood irradiation (ILBI) involves the in-vivo illumination of the blood by feeding low level laser light generated by a 1-3 mW helium-neon laser at a wavelength of 632.8 nm into a vascular channel, usually a vein in the forearm, under the assumption that any therapeutic effect will be circulated through the circulatory system. Most often wavelengths of 365, 405, 525 and 635 nm and power of 2.3 mW are used. The technique is widely used at present in Russia, less in Asia, and not extensively in other parts of the world. It is shown that ILBI improves blood flow and its transport activities, therefore, tissue trophism, has a positive effect on the immune system and cell metabolism. This issue is subject to skepticism. There have been some calls to increase research on this topic. Transcutaneous therapy applies laser light on unbroken skin in areas with large numbers of blood vessels (such as the forearm). Because of the skin acting as a barrier to the blood, absorbing low level laser energy, the power of the laser is often boosted to compensate. The problem can be solved by using pulsed matrix laser light sources. Extracorporeal irradiation is used only for ultraviolet blood irradiation, that involves drawing blood out through a vein and irradiating it outside of the body. Though promoted as a treatment for cancer, a 1952 review in the Journal of the American Medical Association and another review by the American Cancer Society in 1970 concluded the treatment was ineffective.

Extracorporeal photopheresis (ECP), also known as extracorporeal photoimmunotherapy or photochemotherapy, is a leukapheresis-based therapy which was initially used in patients with cutaneous T-cell lymphoma (CTCL). Specifically, for the treatment of therapy refractory CTCL patients suffering from the leukemic variant, the Sézary Syndrome, ECP received FDA (United States Food and Drug Administration) approval in 1988. During ECP, whole blood of the patient is collected via a cubital vein, or a permanently implanted catheter, for separation of leucocytes from plasma and non-nucleated cells. With a specifically constructed device for this procedure, collected leukocytes, the so-called buffy coat, are then exposed to ultraviolet-A (UVA) irradiation in the presence of a photosensitizing agent, 8-methoxypsoralen prior to reinfusion to the patient.

Two basically different methods for performing ECP procedure have been described and comprised by the present invention. They differ in the device used for leukocyte collection and UVA irradiation: the "closed system" and the so called "open system." The closed system is based on the original design by Edelson and coworkers and is the only FDA-approved system. The open system is a system incorporating different separation instruments, mostly used outside the United States. Although ECP is a valid treatment method since 30 years and over 2 million of treatments have been performed, there are no reports about negative cytogenetic effects.

Indications for initiating ECP were continuously extended since its introduction. ECP treatments are generally well-tolerated by patients and there are almost no significant unwanted side effects. Taken together, ECP combines an excellent safety profile with efficacy.

Extracorporeal photopheresis (also sometimes referred to as extracorporeal photochemotherapy) is a process that includes: (1) collection of mononuclear cells (MNC) from a patient, (2) photoactivation treatment of the collected MNC cells; and (3) reinfusion of the treated cells (MNC) back to the patient. More specifically, ECP involves the extracorporeal exposure of peripheral blood mononuclear cells combined with a photoactive compound, such as 8-methoxypsoralen or "8-MOP" which is then photoactivated by ultraviolet light, followed by the reinfusion of the treated mononuclear cells. It is believed that the combination of 8-MOP and UV radiation causes apoptosis or programmed cell death of ECP-treated T-cells.

Although the precise mechanism of action in ECP treatment (in the different disease states) is not fully known, according to early theories, it was believed that photoactivation causes 8-MOP to irreversibly covalently bind to the DNA strands contained in the T-cell nucleus. When the photochemically damaged T-cells are reinfused, cytotoxic effects are induced. For example, a cytotoxic T-cell or "CD8+ cell" releases cytotoxins when exposed to infected or damaged cells or otherwise attacks cells carrying certain foreign or abnormal molecules on their surfaces. The cytotoxins target the damaged cell's membrane and enter the target cell, which eventually leads to apoptosis or programmed cell death of the targeted cell. In other words, after the treated mononuclear cells are returned to the body, the immune system recognizes the dying abnormal cells and begins to produce healthy lymphocytes (T-cells) to fight against those cells.

In addition to the above, it has also been theorized that extracorporeal photopheresis also induces monocytes (a type of mononuclear cell) to differentiate into dendritic cells capable of phagocytosing and processing the apoptotic T-cell antigens. When these activated dendritic cells are re-infused into systemic circulation, they may cause a systemic cytotoxic CD8+T-lymphocyte-mediated immune response to the processed apoptotic T-cell antigens like that described above. It will be appreciated that other possible mechanisms of action may be involved in achieving the benefits that have been observed from the ECP treatment of mononuclear cells and the subsequent benefits to patients undergoing ECP based therapies.

More recently, it has been postulated that ECP may result in an immune tolerant response in the patient. For example, in the case of graft versus-host disease, the infusion of apoptotic cells may stimulate regulatory T-cell generation, inhibit inflammatory cytokine production, cause the deletion of effective T-cells and result in other responses. See Peritt, "Potential Mechanisms of Photopheresis in Hematopoietic Stem Cell Transplantation," Biology of Blood and Marrow Transplantation 12:7-12 (2006). While presently the theory of an immune tolerant response appears to be among the leading explanations, there exist other theories as to the mechanism of action of ECP relative to graft-versus-host disease, as well as other disease states.

Systems for performing ECP include, for example, the UVAR XTS Photopheresis System and the CellEx Photopheresis System available from Therakos, Inc., of Exton, Pa. Further details of performing ECP on the Therakos system can be found, for example, in U.S. Pat. No. 5,984,887.

There are currently two commonly used methods for performing photopheresis-online and offline systems and methods.

In online methods, a dedicated photopheresis device, such as the Therakos device mentioned above, is used to perform the entire therapy including reinfusion of treated MNCs. Such devices are "dedicated" photopheresis devices, designed only for performing photopheresis and cannot perform other collection protocols needed in a hospital or blood processing setting including, for example, multifunctional apheresis protocols for collection of platelets, plasma, RBCs, ganulocytes and/or perform plasma/RBC exchange protocols.

In offline photopheresis methods, a multifunctional apheresis device may be used to collect mononuclear cells. The collected MNCs, typically contained in one or more collection containers, are severed or otherwise separated from the tubing set used during collection, where they are later treated in a separate irradiation or UVA light device followed by manual reinfusion of the treated cells to a patient. However, during such offline methods, when the cells are transferred from the apheresis device to the irradiation device (which device may be located in another room or laboratory) communication with the donor must be severed and accordingly, the cells detached from the donor. Thus, additional traceability procedures are required to ensure that the treated MNC product is ultimately reinfused into the correct donor.

Devices and Immobilization of the Enzyme in the Device:

In embodiments of the invention, the ECP system may comprise a device comprising a matrix with immobilized immunomodulatory molecules or other biomolecules, such as enzymes. Preferably, the matrix with the coupled molecules is exposed to blood or MNCs in the context of the invention.

The "matrix" as used herein thus refers to a material inside the blood treatment device that provides an internal material or surface through or over which blood or plasma is passed. The matrix as used in the context of the present invention preferably comprises a support to which the immobilized immunomodulatory molecules or other biomolecules are bound. The support therefore serves as a carrier for the immobilized immunomodulatory molecules or other biomolecules, even though it may fulfil other functions.

The "support" as used herein refers to the portion of the matrix which serves as the "substrate" or "support material" to which the immobilized immunomodulatory molecules or other biomolecules according to the invention are bound. Such support or support material is sometimes also referred to as "adsorption material" or "adsorber", as used in an "adsorption column" or "column" or "adsorption cartridge". A suitable support according to the present invention should be uniform, hydrophilic, mechanically and chemically stable over the relevant pH range and temperature with no or a negligible leaching of the enzyme during use, have good flow characteristics for whole blood and/or blood plasma, and provides a large surface area for enzyme attachment.

The support can for example be a resin, a membrane or a non-woven material. A "non-woven" material refers to a material which is broadly defined as a sheet, fabric or web structure bonded together by entangling fiber or filaments (and by perforating films) mechanically, thermally, or chemically but not by weaving or knitting. A "resin" refers to an insoluble material which can take the form of gels or gel beads or microporous beads, or a sponge. Such resins can be natural or bio-polymers, synthetic polymers and inorganic materials. Agarose, dextrose and cellulose beads are commonly employed natural supports. Synthetic polymeric or organic supports are mostly based on acrylamide, polystyrene and polymethacrylate derivatives, whereas, porous silica and glass are some frequently used inorganic supports.

According to one embodiment of the invention, the resin is composed of polymers selected from the group consisting of alginate, chitosan, chitin, collagen, carrageenan, gelatin, cellulose, starch, pectin and sepharose; inorganic materials selected from the group consisting of zeolites, ceramics, celite, silica, glass, activated carbon and char-coal; or synthetic polymers selected from the group consisting of polyethylene (PE), polyoxymethylene (POM), polypropylene (PP), polyvinylchloride (PVC), polyvinyl acetate (PVA), polyvinylidene chloride (PVDC), polystyrene (PS), polytetrafluoroethylene (PTFE), polyacrylate (PAA), polymethyl methacrylate (PMMA), polyacrylamide, polyglycidyl methac-rylate (PGMA), acrylonitrile butadiene styrene (ABS), polyacrylonitrile (PAN), polyester, polycarbonate, polyethylene terephthalate (PET), polyamide, polyaramide, polyethylene glycol (PEG), polyvinylpyrrolidone (PVP), polysulfone (PS), polyethersulfone (PES), polyarylethersulfone (PEAS), eth-ylene vinyl acetate (EVA), ethylene vinyl alcohol (EVOH), polyamideimide, polyaryletherketone (PAEK), polybutadiene (PBD), polybutylene (PB), polybutylene terephthalate (PBT), polycaprolactone (PCL), polyhydroxyalkanoate, polyether ether ketone (PEEK), polyether ketone ketone (PEKK), polyether imide (PEI), polyimide, polylactic acid (PLA), polymethyl pentene (PMP), poly(p-phenylene ether) (PPE), polyurethane (PU), styrene acrylonitrile (SAN), polybutenoic acid, poly(4-allylbenzoic acid), poly(glycidyl acrylate), polyglycidyl methacrylate (PGMA), acrylonitrile butadiene styrene (ABS), polydivinylbenzene (PDVB), poly(allyl glycidyl ether), poly(vinyl glycidyl ether), poly(vinyl glycidyl urethane), polyallylamine, pol-yvinylamine, copolymers of said polymers and any of these polymers modified by introduction of functional groups.

Various known methods can be used to immobilize the immobilized immunomodulatory molecules or other biomolecules to the support and/or matrix according to the invention. Such immobilization preferably is specific or selective in that it immobilizes the enzyme whereas other proteins and components present in blood or blood plasma or a sample thereof (in vitro) are not immobilized to a significant degree.

The "immobilizing" of an immobilized immunomodulatory molecules or other biomolecules to the support for providing a matrix which can be used in a device according to the invention refers to a non-covalent or covalent interaction that holds two molecules together. According to one embodiment of the invention, the expression refers to a covalent interaction, i.e. to covalently bound immobilized immunomodulatory molecules or other biomolecules. Non-covalent interactions include, but are not limited to, hydrogen bonding, ionic interactions among charged groups, van der Waals interactions, and hydrophobic interactions among non-polar groups. One or more of these interactions can mediate the binding of two molecules to each other. Binding may otherwise be specific or selective, or unspecific.

According to one embodiment, the immobilized immunomodulatory molecules or other biomolecules comprises affinity tags for immobilizing it on the support. Affinity tags can be used for purifying the protein during production and/or for immobilizing them on the support of the matrix of the present invention. Affinity tags can be short polypeptide sequences or whole proteins, co-expressed as fusion partners with the enzymes. Different types of affinity tags are well known in the art, wherein polyhistidine or $His_6$-tags, C-myc-tags and FLAG-tags are especially well described and are options for binding the enzymes according to the invention to the support material. The noncovalent linkage of biotin to strepavidin or avidin can also be used to immobilize the immobilized immunomodulatory molecules or other biomolecules to a support.

According to another embodiment of the invention, the immobilized immunomodulatory molecules or other biomolecules are covalently attached to the support as further detailed below and/or as described the prior art. Covalent coupling generally includes either covalent non-site directed attachment of the protein or site-directed attachment of the protein. The support which forms the basis for the generation of a matrix must provide or facilitate chemical activation, thus allowing the chemical coupling of the immobilized immunomodulatory molecules or other biomolecules. Many coupling methods for immobilizing immobilized immunomodulatory molecules or other biomolecules are well known in the art.

For example, the activation chemistry should be stable over a wide range of pH, buffer conditions and temperature resulting in negligible leaching of the enzymes. The coupling method should avoid improper orientation, multisite attachment or steric hindrance of the immobilized immunomodulatory molecules or other biomolecules. The enzyme density per volume of matrix can be optimized to promote target accessibility and reaction.

The covalent coupling can be carried out via common functional groups, including amines, alcohols, carboxylic acids, aldehydes and epoxy groups. Carbodiimide compounds can be used to activate carboxylic groups of proteins for direct conjugation to the primary amines on the support surface via amide bonds. The most commonly used carbodiimides are the water-soluble EDC (1-ethyl-3-(-3-dimethylaminopropyl) carbodiimide) for aqueous crosslinking and the water-insoluble DCC (N', N'-dicyclohexyl carbodiimide) for non-aqueous organic synthesis methods.

Alternatively, the supports may carry specific functional groups for coupling a linker and/or enzyme thereto. For example, functionalized resins are commercially available and known to a person with skill in the art. A wide range of coupling chemistries, involving primary amines, sulfhydryls, aldehydes, hydroxyls and carboxylic acids are available in said commercial supports. Examples for commercially available activated resins are CarboLink Coupling resin, Profinity™ Epoxide resin, Affi-Gel 10 and 15, Epoxy-activated Sepharose™ 6B, Tresyl chloride-activated agarose, and Purolite® Lifetech™ methacrylate polymers functionalized with epoxy groups.

According to one embodiment of the invention, the support material should be porous, wherein the pore size is in the range of from 10 to 200 nm. According to another embodiment of the invention, the support takes the form of beads. According to yet another embodiment, the support according to the invention comprises magnetic beads. Magnetic beads are prepared by entrapping magnetite within agarose or other polymeric material, on which the enzyme according to the invention is immobilized.

According to another embodiment of the present invention the support is a membrane. Membranes as components of affinity matrices have been used in protein purification, due to their simplicity, ease of handling, reduced surface area and lower diffusion limitations compared to gels, resins and beads. The membranes can take the physical form of a hollow fiber or, alternatively, of a flat sheet membrane. According to one embodiment, the support comprises a hemodialysis hollow fiber membrane dialyzer, wherein the filter is a hemodialyzer.

The hollow fiber or flat sheet membranes for use as supports in a device according to the invention may be composed of cellulose, cellulose ester (cellulose acetate and cellulose triacetate), poly(methylmethacrylate)(PMMA), polyamide (PA), other nitrogen-containing polymers (polybenzimidazole, polyacrylonitrile (PAN), polyglycidyl methacrylate (PGMA), polyvinylpyrrolidone (PVP), polysulfone (PS), polyethersulfone (PES) or polyarylethersulfone (PAES). A hollow fiber membrane which can advantageously be utilized for providing a device according to the invention preferably has an inner diameter in the range of 100 to 500 µm. According to another embodiment of the invention, specifically when the membrane support is a hemodialysis membrane as described above, the hollow fiber membranes are additionally or alternatively functionalized with an enzyme according to the invention on the lumen side of the fibers where they can directly interact with the target metabolite in the blood or blood plasma which perfuses the lumen of the hollow fiber membrane. The enzyme may also or alternatively be immobilized to the outside of the membrane.

Methods of Extracorporeal Blood Treatment:

The invention includes devices which are configured to be located in an extracorporeal blood circuit through which the blood of a patient passes and which comprises means for transporting blood from the patient's vascular system to a blood treatment device at a defined flow rate and then returning the treated blood back to the patient, and wherein the device is further configured to reduce levels of ADMA and/or MMA in the blood. Furthermore, the invention also includes devices that can be used for extracorporeal blood or blood cell treatment, wherein that devices can be separate or disconnected or separable/detachable from the extracorporeal blood circuit.

According to the invention, the expression "extracorporeal blood purification" refers preferably to the process of removing substances from body fluids through their clearance from flowing blood in a diverted circuit outside the patient's body (extracorporeal). Said substances may include endogenous toxins (i.e., uremic toxins), exogenous poisons (i.e., ethylene glycol or fungal toxin), administered drugs, viruses, bacteria, antibodies, metabolites and proteins (i.e., IMHA, myasthenia gravis), abnormal cells (i.e., leukemia), and excessive water. Therapeutic procedures include hemodialysis, including intermittent hemodialysis (HD, HDF, HF) and continuous renal replacement therapy (CRRT); hemoperfusion; plasma exchange and therapeutic apheresis. Such methods are known to a skilled person and the device of the invention can be incorporated accordingly.

The expression "blood" as used herein refers to whole blood which contains all components of the blood of an organism, including red cells, white cells, and platelets suspended in plasma. The expression "blood plasma" refers to the fluid, composed of about 92% water, 7% proteins such as albumin, gamma globulin, fibrinogen, complement factors, clotting factors, and 1% mineral salts, sugars, fats, electrolytes, hormones and vitamins which forms part of whole blood but no longer contains red and white cells and platelets. In the context of the present invention, the expression "blood plasma" or "plasma" refers to specific fractions of the above defined blood plasma in its standard meaning, such as, for example, blood serum.

According to one aspect, blood flow rates in an extracorporeal blood purification circuit are between 20 ml and 700 ml/min. Typical dialysate flow rates in an extracorporeal circuit comprising a hemodialyzer for the treatment of renal failure, either in addition to the blood treatment device according to the invention or in cases where the hemodialyzer in addition is configured to metabolic ADMA and/or MMA, is in the range of between 0.5 l/h and 800 ml/min.

In therapeutic apheresis whole blood can be treated or blood is separated into its component fractions, for example by centrifugation or by means of a plasma membrane or filter, and the fraction containing the solute which shall be removed, is specifically treated prior to return to the patient. The present invention provides for an apheresis treatment in which whole blood or plasma (containing the target proteins) is removed from the patient's flowing blood and, after having been contacted with a device or matrix according to the invention is returned to the patient. Typical blood or plasma flow rates in an extracorporeal circuit wherein the blood treatment device is perfused with whole blood or plasma is in the range of between 30 ml/min and 200 ml/min, or 7 ml/min and 50 ml/min respectively.

According to one aspect, the extracorporeal blood circuit according to the invention is configured to perform hemodialysis. In this case, the device according to the invention is, for example, a hemodialyzer which additionally has been configured to immobilize a target protein according to the invention. The circuit can be operated in different treatment modes depending on the medical need, including hemodialysis, hemodiafiltration, hemofiltration mode.

Immune-Related Adverse Events (irAE)

As used herein, the term "Immune-related adverse events" (irAE) relates any side effect specific that specifically occur in the context of an immune checkpoint inhibitor treatment, for example in the context of a cancer therapy. IrAEs are unique and are different to adverse events occurring in the context of traditional cancer therapies, and typically have a delayed onset and prolonged duration. IrAEs can involve any organ or system. These effects are frequently low grade and are treatable and reversible; however, some adverse effects can be severe and lead to permanent disorders. Management is primarily based on corticosteroids and other immunomodulatory agents, which should be prescribed carefully to reduce the potential of short-term and long-term complications.

In particular comprised by the term are symptoms of an autoimmune disease and autoimmune disease, such as (auto-immune) colitis, (autoimmune)hepatitis, (autoimmune)thyroiditis and (autoimmune)dermatitis.

The irAE due to administration of a checkpoint-inhibitor therapy in the present invention is not particularly limited. An irAE is to be understood as an adverse event that is presumed to be immune-related: irAE (see, for example, Drug Interview Form of OPDIVO® Intravenous Infusion 20 mg-100 mg, revised in April 2016 (version 9); Properties and Handling of Adverse Events of an Anti-CTLA-4 Antibody, Ipilimumab (YERVOY®), dated Aug. 24, 2015; issued by the Committee on Safety of New Drugs for Malignant Melanoma of the Japanese Dermatological Association).

Specific embodiments of the irAE of the present invention include interstitial lung disease, myasthenla gravis, myositis, colitis, type 1 diabetes mellitus, hepatic dysfunction (hepatic disorder), pulmonary disorder such as hepatitis (e.g., autoimmune pneumonia), pituitarism such as hypopituitarism or hypophysitis, thyroid dysfunction such as hypothyroidism, neuropathy, nephropathy, encephalitis, adrenal disorder such as adrenal insufficiency, severe skin disorder, venous thromboembolism, infusion reaction, psoriasis, psoriasiform rash, diarrhea (e.g., severe diarrhea), rheumatoid arthritis, uveitis, episcleritis, bursitis, exacerbation of radiodermatitis, chronic inflammatory demyelinating polyneuropathy (hereinafter also referred to as demyelinating polyneuropathy), biliary tract disorder, or nephritis, and pituitarism is preferable.

The immune-related adverse event (IrAE) has been known to occur, for example, after 8 weeks or 8 to 12 weeks after administration. The immune-related adverse event can be evaluated by "grade" or "IrAE evaluation". Here, "irAE evaluation" is an index representing the seriousness of a disease, and is represented by 1 to 3. In the irAE evaluation, 1 represents a condition that "does not require additional therapeutic intervention due to irAE", 2 represents a condition that "requires drug intervention, etc., due to irAE, but does not require hospitalization treatment or does not require interruption of treatment", and 3 represents a condition that "requires drug intervention, etc., accompanied by hospitalization due to irAE and requires interruption of treatment". The correspondence between "irAE evaluation" and "grade" varies depending on each disease.

Immune Checkpoint Molecules and Checkpoint Modulators

In the context of the present invention, an immune checkpoint inhibitor is a drug that activates immune cells by modulating immune checkpoint molecules.

Immune checkpoint molecules are molecules in the immune system that either turn up a signal (co-stimulatory molecules) or turn down a signal provided to immune effector cells. Thus, immune checkpoint molecules can be subdivided into co-stimulatory checkpoint molecules or co-inhibitory checkpoint molecules. Co-stimulatory checkpoint molecules include co-stimulatory lymphocyte receptors, which are lymphocyte surface-receptors that can lead to an activation or stimulation of lymphocyte effector functions. Co-inhibitory checkpoint molecules include co-inhibitory lymphocyte receptors, which are lymphocyte surface-receptors that can lead to an inhibition of lymphocyte effector functions.

Co-stimulatory checkpoint molecules comprise, without limitation, HVEM, CD27, CD40, OX40, GITR, CD137, CD28 and ICOS.

In preferred embodiments of the present invention, the term co-stimulatory lymphocyte receptor does not refer to CD122.

HVEM (Herpesvirus entry mediator, CD270) is also known as tumor necrosis factor receptor superfamily member 14 (TNFRSF14) and is a receptor of the TNF-receptor superfamily, which can bind to BTLA.

CD27 supports antigen-specific expansion of naïve T cells and is vital for the generation of T cell memory and is also a memory marker of B cells. CD27's activity is governed by the transient availability of its ligand, CD70, on lymphocytes and dendritic cells. CD27 costimulation is known to suppress Th17 effector cell function. The agonistic monoclonal antibody CDX-1127/Varlilumab against CD27 has been shown to be effective in the context of T cell receptor stimulation in animal models.

CD28 is constitutively expressed on almost all human CD4+ T cells and on around half of all CD8 T cells. Binding of one of its two ligands CD80 and CD86, expressed for example on dendritic cells, prompts T cell expansion.

CD40 is expressed on a variety of immune system cells including antigen-presenting cells. The ligand of CD40 is called CD40L, also known as CD154, and is transiently expressed on the surface of activated CD4+ T cells, as its ligand. CD40 signaling is known to 'license' dendritic cells to mature and thereby trigger T-cell activation and differentiation.

4-1BB (CD137) is bound by CD137 ligand resulting in T-cell proliferation. CD137-mediated signaling is also known to protect T cells, and in particular, CD8+ T cells from activation-induced cell death. The fully human IgG2 agonistic monoclonal antibody Utomilumab (PF-05082566) targets 4-1 BB to stimulate a more intense immune system attack on cancers.

OX40 (CD134) has OX40L (CD252) as its ligand. OX40 promotes the expansion of effector and memory T cells and is also known for its ability to suppress the differentiation and activity of T-regulatory cells. OX40 is being transiently expressed after T-cell receptor engagement, which is why it is only upregulated on the most recently antigen-activated T cells within inflammatory lesions, which is why OX40 is a valuable drug target. Agonistic anti-OX40 monoclonal antibodies have been shown to have clinical utility in advanced cancer. The pharma company AstraZeneca has three drugs in development targeting OX40: MED10562 is a humanized OX40 agonist; MED16469, murine OX40 agonist; and MED16383, an OX40 agonist.

GITR (Glucocorticoid-Induced TNFR family Related gene) prompts T cell expansion. The ligand for GITR (GITRL) is mainly expressed on antigen presenting cells. Antibodies to GITR have been shown to promote an antitumor response through loss of Treg lineage stability.

ICOS (Inducible T-cell costimulator, also called CD278) is expressed on activated T cells. Its ligand is ICOSL, expressed mainly on B cells and dendritic cells. The molecule seems is important in T cell effector function.

Co-inhibitory checkpoint molecules comprise, without limitation, A2AR, B7-H3, B7-H4, BTLA, CTLA-4, IDO, KIR, LAG3, PD-1, TIM-3, TIGIT and VISTA.

A2AR (Adenosine A2A receptor) is regarded as an important checkpoint in cancer therapy because adenosine in the immune microenvironment, leading to the activation of the A2a receptor, is negative immune feedback loop and the tumor microenvironment has relatively high concentrations of adenosine.

B7-H3, also called CD276, was originally understood to be a co-stimulatory molecule but is now regarded as co-inhibitory. MacroGenics is working on MGA271 (Enoblituzumab), which is an Fc-optimized monoclonal antibody that targets B7-H3.

B7-H4 (or VTCN1) is expressed by tumor cells and tumor-associated macrophages and plays a role in tumor evasion.

BTLA (B and T Lymphocyte Attenuator, also called CD272) is a co-inhibitory receptor, which has HVEM (Herpesvirus Entry Mediator) as its ligand. Surface expression of BTLA is gradually downregulated during differentiation of human CD8+ T cells from the naive to effector cell phenotype, however tumor-specific human CD8+ T cells express high levels of BTLA.

CTLA-4 (Cytotoxic T-Lymphocyte-Associated protein 4, also called CD152) is expressed on Treg cells and serves to control T cell proliferation. CTLA-4 (CD152) is a protein receptor functioning as an immune checkpoint and is expressed by activated T cells and transmits an inhibitory signal to T cells. CTLA4 is homologous to the T-cell co-stimulatory protein CD28, and both molecules bind to CD80 and CD86 (B7-1 and B7-2 respectively), on antigen-presenting cells. CTLA-4 has a greater affinity and avidity to CD80 and CD86 with than CD28. CTLA4 transmits an inhibitory signal to T cells. Antagonistic antibodies directed against CTLA4 include ipilimumab and tremelimumab.

IDO (Indoleamine 2,3-dioxygenase) is a tryptophan catabolic enzyme with immune-inhibitory properties. Another important molecule is TDO, tryptophan 2,3-dioxygenase. IDO is known to suppress T and NK cells, generate and activate Tregs and myeloid-derived suppressor cells, and promote tumor angiogenesis.

KIR (Killer-cell Immunoglobulin-like Receptor) is a receptor for MHC Class I molecules on Natural Killer cells. Lirilumab is a monoclonal antibody to KIR.

LAG-3 (Lymphocyte Activation Gene-3) works to suppress an immune response by action to Tregs as well as direct effects on CD8+ T cells.

PD-1 (Programmed Death 1, or CD279) is a cell surface receptor that plays an important role in down-regulating the immune system and promoting self-tolerance by suppressing T cell inflammatory activity. PD-1 has two ligands, PD-L1 and PD-L2. An advantage of targeting PD-1 is that it can restore immune function in the tumor microenvironment. PD-L1, the ligand for PD1, is highly expressed in several cancers and can lead to the inhibition of anti-cancer immune response by T cells. A number of cancer immunotherapy agents that target the PD-1 receptor have been developed, including the antagonistic antibodies nivolumab, (Opdivo—Bristol Myers Squibb), Pembrolizumab (Keytruda, MK-3475, Merck), Pidilizumab (CT-011, Cure Tech) and BMS-936559 (Bristol Myers Squibb). Both Atezolizumab (MPDL3280A, Roche) and Avelumab (Merck KGaA, Darmstadt, Germany & Pfizer) are monoclonal antibodies directed against PD-L1, the ligand of PD-1.

TIM-3 (T-cell Immunoglobulin domain and Mucin domain 3) expresses on activated human CD4+ T cells and regulates Th1 and Th17 cytokines. TIM-3 acts as a negative regulator of Th1/Th17 function by triggering cell death upon interaction with its ligand, galectin-9.

VISTA (V-domain Ig suppressor of T cell activation) is a protein that is primarily expressed on hematopoietic cells so that consistent expression of VISTA on leukocytes within tumors may allow VISTA blockade to be effective across a broad range of solid tumors.

TIGIT (T cell immunoreceptor with Ig and ITIM domains, also called WUCAM and Vstm3) is an immune receptor present on some T cells and Natural Killer Cells and regulates T cell mediated immunity. TIGIT could bind to CD155 on DCs and macrophages with high affinity and to CD112 with lower affinity.

Co-inhibitory lymphocyte receptors of the present invention comprise PD-1, CTLA-4, TIM-3, LAG-3, TIGIT, BTLA or VISTA. Co-stimulatory lymphocyte receptors of the present invention comprise OX40, 4-1 BB, GITR, CD27, HVEM, CD28 or CD40.

An inhibitor of a receptor prevents the generation of a signal by the respective receptor. Accordingly, an inhibitor of a co-inhibitory lymphocyte receptor is a molecule that prevents the activation of the respective receptor and thereby prevents the generation of an inhibitory signal. Conversely, an activator of a receptor induces the generation of a signal by the respective receptor and an activator of a co-stimulatory lymphocyte receptor leads to the generation of a stimulatory signal.

Checkpoint modulators are molecules that interfere with the activity of immune checkpoint molecules, either by stimulating or inhibiting the activity of immune checkpoint molecules.

Soluble checkpoint modulators are molecules that may be able to freely diffuse and, for example, are not bound to a cell membrane or do not remain intracellular.

Checkpoint inhibitors in the sense of the invention comprise lymphocyte-stimulating checkpoint modulators, which are molecules that lead to an activation of lymphocytes, preferably effector T cells, either through activation of a co-stimulatory checkpoint molecule, or through inhibition of a co-inhibitory checkpoint molecules. Furthermore, soluble lymphocyte-stimulating checkpoint modulators include molecules that interfere with the activation of membrane bound immune checkpoint molecules, such as a soluble form of the respective immune checkpoint molecule.

Checkpoint modulators can be naturally occurring molecules or engineered molecules with the respective function interfering with or modulating the activity of an immune checkpoint molecule. Checkpoint modulators include, for example, antibodies or antibody-fragments activity directed against immune checkpoint molecule with agonistic or antagonistic, and ligands or modified ligands of immune checkpoint molecules.

Immune Cells:

Immune cells as described herein relate to biological cells involved in the immune response in a subject. Immune cells are preferably selected from T Cells, B Cells, Dendritic Cells, Granulocytes, Innate Lymphoid Cells (ILCs), Megakaryocytes, Monocytes/Macrophages, Natural Killer (NK) Cells, Platelets, Red Blood Cells(RBCs) and/or Thymocytes.

The term "immune cells" comprises the MNCs comprised in blood, which may also be called peripheral blood mononuclear cell (PBMC). PBMCs comprise any peripheral blood cell having a round nucleus and consist mainly of lymphocytes (T cells, B cells, NK cells) and monocytes, whereas erythrocytes and platelets have no nuclei, and granulocytes (neutrophils, basophils, and eosinophils) have multi-lobed nuclei. In humans, lymphocytes make up the majority of the PBMC population, followed by monocytes, and only a small percentage of dendritic cells. These cells can be extracted from whole blood using ficoll, a hydrophilic polysaccharide that separates layers of blood, and gradient centrifugation, which will separate the blood into a top layer of plasma, followed by a layer of PBMCs and a bottom fraction of polymorphonuclear cells (such as neutrophils and eosinophils) and erythrocytes. The polymorphonuclear cells can be further isolated by lysing the red blood cells. Basophils are sometimes found in both the denser and the PBMC fractions.

T cells or T lymphocytes are a type of lymphocyte (a subtype of white blood cell) that plays a central role in cell-mediated immunity. They can be distinguished from other lymphocytes, such as B cells and natural killer cells, by the presence of a T-cell receptor on the cell surface. The several subsets of T cells each have a distinct function. T cell subtypes include, without limitation, T helper type 1 (Th1) cells, T helper type 2 (Th2) cells, T helper type 9 (Th9) cells, T helper type 17 (Th17) cells, T helper type 22 (Th22) cells, Follicular helper T (Tfh) cells, Regulatory T (Treg) cells, Natural killer T (NKT) cells, Gamma delta T cells, CD8+ cytotoxic T lymphocytes (CTLs). Further non-limiting embodiments of T cells include thymocytes, immature T lymphocytes, mature T lymphocytes, resting T lymphocytes, cytokine-induced killer cells (CIK cells) or activated T lymphocytes. Cytokine-induced killer (CIK) cells are typically CD3– and CD56-positive, non-major histocompatibility complex (MHC)-restricted, natural killer (NK)-like T lymphocytes. The T cell can be a CD4+ T cell, a cytotoxic T cell (CTL; CD8+ T cell), CD4+CD8+ T cell, CD4 CD8 T cell, or any other subset of T cells.

The present invention in particular relates to immunoregulatory NK cells (which can also be referred to as immunomodulatory NK cells) for use in the treatment and/or prevention of immune-related adverse events (irAE) in a subject that has received a checkpoint-inhibitor therapy, preferably as a cellular therapy.

Immunomodulatory NK cells are a specific form of innate lymphoid cells (ILCs). ILCs are a group of innate immune cells that belong to the lymphoid lineage (lymphocytes) but do not respond in an antigen-specific manner, as they lack a B or T cell receptor. This relatively newly described group of cells has different physiological functions, some of them analogous to helper T cells, while also including the cytotoxic NK cells. In accordance, they have an important role in protective immunity and the regulation of homeostasis and inflammation. Natural killer (NK) cells are cytotoxic innate effector cells analogous to the cytotoxic T cells of the adaptive immune system. They are distributed throughout the blood, organs, and lymphoid tissue and make up around 15% of the peripheral blood lymphocytes. NK cells play a role in tumor surveillance and the rapid elimination of virus-infected cells. They do not require the missing "self" signal of MHC Class I and can recognize stressed cells in the absence of antibodies, allowing them to react much more quickly than the adaptive immune system. Natural killer (NK) cells play critical roles in host immunity against cancer. In response, cancers develop mechanisms to escape NK cell attack or induce defective NK cells (Cheng M et al. Cell Mol Immunol. 2013 May; 10(3):230-52. doi: 10.1038/cmi.2013.10. Epub 2013 Apr. 22.).

Immunoregulatory NK cells of the invention are preferably characterized by low expression (or downregulated expression) or CD16, in particular on $CD56^{dim}$ NK cells. CD16 is the FcRγIII, an activating NK cell receptor that can induce strong cytokine production. Shedding/downregulation of CD16 can be an immuno-regulatory mechanism of NK cells to prevent autoimmunity. CD16 downregulation modulates NK cell responses and contributes to maintenance of the immune homeostasis of both antibody and T cell-dependent pathways. Furthermore, immunoregulatory NK cells of the invention can display low expression of GM-CSF, IFN-γ, TNF and/or IL-2.

In embodiments, generating or induction of immunoregulatory NK cells in a sample can be measured by comparing the NK cells phenotype and population distribution of NK cells in a sample before and after performing the method of the invention, for example by flow cytometry, gene expression and/or mass spectrometry analysis of protein abundance. For example, a shift from CD16-high to CD16-low NK cells after irradiation is indicative in of the induction of an immunoregulatory phenotype. Furthermore, a decrease in the of GM-CSF, IFN-γ, TNF and/or IL-2 expression in the NK cells population would also indicate induction of immunoregulatory NK cells. A skilled person is aware of suitable methods and protocols of identifying different NK cell populations within a sample. For example, in a blood-derived sample, the total NK cell population may be defined and identified, preferably by flow cytometry, as the CD45-positive, CD14-negative, CD3-negative, CD19-negative and CD56-positive cell population. Within this population, further identification and quantification of immunoregulatory NK cells, for example by determining CD16, GM-CSF, IFN-γ, TNF and/or IL-2 expression can be performed. Immunoregulatory NK cells are preferably positive for CD56, but display a comparably low expression level of CD56 ("dim" expression).

Further characteristics and definitions of immunoregulatory NK cells are well established in the art and are subject of multiple research and review articles that are known or can be identified by a skilled person.

The term "immunomodulatory functions" relates to functions or properties of molecules or cells that induce a changes or modulation in the function, action or status of any component of the immune system.

Cellular therapies typically involve the administration of immune cells isolated from the blood of the patient. Cell types that can be used in this way are, without limitation, natural killer cells, lymphokine-activated killer cells, cytotoxic T cells, monocytes, macrophages, granulocytes and dendritic cells. Dendritic cell therapy provokes anti-tumor responses by causing dendritic cells to present tumor antigens. Dendritic cells present antigens to lymphocytes, which activates them, priming them to kill other cells that present the antigen.

Therapeutic Application of the Invention

As used herein, the term "subject" means a human or non-human animal selected for treatment or therapy. The subject or patient, such as the subject in need of treatment or prevention, may be an animal, a vertebrate animal, a mammal, a rodent (e.g. a guinea pig, a hamster, a rat, a mouse), a murine (e.g. a mouse), a canine (e.g. a dog), a feline (e.g. a cat), an equine (e.g. a horse), a primate, a simian (e.g. a monkey or ape), a monkey (e.g. a marmoset, a baboon), an ape (e. g. gorilla, chimpanzee, orangutan, gibbon), or a human. The meaning of the terms "animal", "mammal", etc. is well known in the art and can, for example, be deduced from Wehner und Gehring (1995; Thieme Verlag). In the context of this invention, it is particularly envisaged that animals are to be treated which are economically, agronomically or scientifically important. Preferably, the subject/patient is a mammal. More preferably, the subject/patient is a human.

In embodiments of the present invention, the subject that has received a checkpoint-inhibitor therapy suffers from cancer, such as malignant melanoma or another cancer treatable by checkpoint-inhibitor therapy.

In the context of the present invention, the term "cancer" relates to the treatment of all kinds of cancer, independent of whether the cancer is associated with the formation of a solid tumor or whether the cancer cells do not form a solid tumor, as it is the case for certain leukemias.

Cancer comprises a group of diseases that can affect any part of the body and is caused by abnormal cell growth and proliferation. These proliferating cells have the potential to invade the surrounding tissue and/or to spread to other parts of the body where they form metastasis. Worldwide, there were 14 million new cases of cancer and 8.2 million cancer related deaths in 2012 (World Cancer Report 2014). The majority of cancers is caused by environmental signals involving tobacco use, obesity and infections among others, while around 5-10% are genetic cases. Cancers can be classified into subcategories based on the cell of origin. The most common subcategories are carcinomas from epithelial cells, sarcomas from connective tissue and lymphomas and leukemias from hematopoietic cells. Cancer is associated with a high variety of local and systemic symptoms and cannot be cured in many cases. In light of the high number of new cancer patients and cancer related deaths novel treatment strategies are required.

Cancer according to the present invention refers to all types of cancer or neoplasm or malignant tumors found in mammals, including leukemias, sarcomas, melanomas and carcinomas. Either solid tumors and/or liquid tumors (such as leukemia or lymphoma) may be treated.

Melanomas include, but are not limited to include, for example, acral-lentiginous melanoma, amelanotic melanoma, benign juvenile melanoma, Cloudman's melanoma, S91 melanoma, Harding-Passey melanoma, juvenile melanoma, lentigo maligna melanoma, malignant melanoma, nodular melanoma, subungal melanoma, and superficial spreading melanoma.

Leukemias include, but are not limited to acute nonlymphocytic leukemia, chronic lymphocytic leukemia, acute granulocytic leukemia, chronic granulocytic leukemia, acute promyelocytic leukemia, adult T-cell leukemia, aleukemic leukemia, a leukocythemic leukemia, basophylic leukemia, blast cell leukemia, bovine leukemia, chronic myelocytic leukemia, leukemia cutis, embryonal leukemia, eosinophilic leukemia, Gross' leukemia, hairy-cell leukemia, hemoblastic leukemia, hemocytoblastic leukemia, histiocytic leukemia, stem cell leukemia, acute monocytic leukemia, leukopenic leukemia, lymphatic leukemia, lymphoblastic leukemia, lymphocytic leukemia, lymphogenous leukemia, lymphoid leukemia, lymphosarcoma cell leukemia, mast cell leukemia, megakaryocytic leukemia, micromyeloblastic leukemia, monocytic leukemia, myeloblastic leukemia, myelocytic leukemia, myeloid granulocytic leukemia, myelomonocytic leukemia, Naegeli leukemia, plasma cell leukemia, plasmacytic leukemia, promyelocytic leukemia, Rieder cell leukemia, Schilling's leukemia, stem cell leukemia, subleukemic leukemia, and undifferentiated cell leukemia.

Sarcomas include, but are not limited to a chondrosarcoma, fibrosarcoma, lymphosarcoma, melanosarcoma, myxosarcoma, osteosarcoma, Abernethy's sarcoma, adipose sarcoma, liposarcoma, alveolar soft part sarcoma, ameloblastic sarcoma, botryoid sarcoma, chloroma sarcoma, chorio carcinoma, embryonal sarcoma, Wilms' tumor sarcoma, endometrial sarcoma, stromal sarcoma, Ewing's sarcoma, fascial sarcoma, fibroblastic sarcoma, giant cell sarcoma, granulocytic sarcoma, Hodgkin's sarcoma, idiopathic multiple pigmented hemorrhagic sarcoma, immunoblastic sarcoma of B cells, lymphoma, immunoblastic sarcoma of T-cells, Jensen's sarcoma, Kaposi's sarcoma, Kupffer cell sarcoma, angiosarcoma, leukosarcoma, malignant mesenchymoma sarcoma, parosteal sarcoma, reticulocytic sarcoma, Rous sarcoma, serocystic sarcoma, synovial sarcoma, and telangiectaltic sarcoma.

Carcinomas include, but are not limited to acinar carcinoma, acinous carcinoma, adenocystic carcinoma, adenoid cystic carcinoma, carcinoma adenomatosum, carcinoma of adrenal cortex, alveolar carcinoma, alveolar cell carcinoma, basal cell carcinoma, carcinoma basocellulare, basaloid carcinoma, basosquamous cell carcinoma, bronchioalveolar carcinoma, bronchiolar carcinoma, bronchogenic carcinoma, cerebriform carcinoma, cholangiocellular carcinoma, chorionic carcinoma, colloid carcinoma, comedo carcinoma, corpus carcinoma, cribriform carcinoma, carcinoma en cuirasse, carcinoma cutaneum, cylindrical carcinoma, cylindrical cell carcinoma, duct carcinoma, carcinoma durum, embryonal carcinoma, encephaloid carcinoma, epiermoid carcinoma, carcinoma epitheliale adenoides, exophytic carcinoma, carcinoma exulcere, carcinoma fibrosum, gelatiniform carcinoma, gelatinous carcinoma, giant cell carcinoma, carcinoma gigantocellulare, glandular carcinoma, granulosa cell carcinoma, hair-matrix carcinoma, hematoid carcinoma, hepatocellular carcinoma, Hurthle cell carcinoma, hyaline carcinoma, hypernephroid carcinoma, infantile embryonal carcinoma, carcinoma in situ, intraepidermal carcinoma, intraepithelial carcinoma, Krompecher's carcinoma, Kulchitzky-cell carcinoma, large-cell carcinoma, lenticular carcinoma, carcinoma lenticulare, lipomatous carcinoma, lymphoepithelial carcinoma, carcinoma medullare, medullary carcinoma, melanotic carcinoma, carcinoma molle, mucinous carcinoma, carcinoma muciparum, carcinoma mucocellulare, mucoepidermoid carcinoma, carcinoma mucosum, mucous carcinoma, carcinoma myxomatodes, nasopharyngeal carcinoma, oat cell carcinoma, carcinoma ossificans, osteoid carcinoma, papillary carcinoma, periportal carcinoma, preinvasive carcinoma, prickle cell carcinoma, pultaceous carcinoma, renal cell carcinoma of kidney, reserve cell carcinoma, carcinoma sarcomatodes, schneiderian carcinoma, scirrhous carcinoma, carcinoma scroti, signet-ring cell carcinoma, carcinoma simplex, small-cell carcinoma, solanoid carcinoma, spheroidal cell carcinoma, spindle cell carcinoma, carcinoma spongiosum, squamous carcinoma, squamous cell carcinoma, string carcinoma, carcinoma telangiectaticurn, carcinoma telangiectodes, transitional cell carcinoma, carcinoma tuberosum, tuberous carcinoma, verrucous carcinoma, and carcinoma villosum.

Additional cancers include, but are not limited to Hodgkin's Disease, Non-Hodgkin's Lymphoma, multiple myeloma, neuroblastoma, breast cancer, ovarian cancer, lung cancer, rhabdomyosarcoma, primary thrombocytosis, primary macroglobulinemia, small-cell lung tumors, primary brain tumors, stomach cancer, colon cancer, malignant pancreatic insulanoma, malignant carcinoid, urinary bladder cancer, premalignant skin lesions, testicular cancer, lymphomas, thyroid cancer, esophageal cancer, genitourinary tract cancer, malignant hypercalcemia, cervical cancer, endometrial cancer, adrenal cortical cancer, and prostate cancer.

In some embodiments, "tumor" shall include, without limitation, a prostate tumor, a pancreatic tumor, a squamous cell carcinoma, a breast tumor, a melanoma, a basal cell carcinoma, a hepatocellular carcinoma, a choloangiocellular carcinoma, testicular cancer, a neuroblastoma, a glioma or a malignant astrocytic tumor such as glioblastma multiforme, a colorectal tumor, an endometrial carcinoma, a lung carcinoma, an ovarian tumor, a cervical tumor, an osteosarcoma, a rhabdo/leiomyosarcoma, a synovial sarcoma, an angiosarcoma, an Ewing sarcoma/PNET and a malignant lymphoma. These include primary tumors as well as metastatic tumors (both vascularized and non-vascularized).

As used herein, "treatment" or "therapy" generally means to obtain a desired pharmacological effect and/or physiological effect. The effect may be prophylactic in view of completely or partially preventing a disease and/or a symptom, for example by reducing the risk of a subject having a particular disease or symptom, or may be therapeutic in view of partially or completely curing a disease and/or adverse effect of the disease. In the present invention, "therapy" includes arbitrary treatments of diseases or conditions in mammals, in particular, humans, for example, the following treatments (a) to (c): (a) Prevention of onset of a disease, condition or symptom in a patient; (b) Inhibition of a symptom of a condition, that is, prevention of progression of the symptom; (c) Amelioration of a symptom of a condition, that is, induction of regression of the disease or symptom.

As used herein, the term "administering" means providing cells or liquid containing or composition to a subject, and includes, but is not limited to, administering by a medical professional and self-administering. Administration of a composition, substance, a compound or an agent to a subject can be carried out using one of a variety of methods known to those skilled in the art. For example, a compound or an agent can be administered, intravenously, arterially, intradermally, intramuscularly, intraperitoneally, subcutaneously, ocularly, sublingually, orally (by ingestion), intranasally (by inhalation), intraspinally, intracerebrally, and transdermally (by absorption, e.g., through a skin duct). A compound or agent can also appropriately be introduced by rechargeable or biodegradable polymeric devices or other devices, e.g., patches and pumps, or formulations, which provide for the extended, slow or controlled release of the compound or agent. Administering can also be performed, for example, once, a plurality of times, and/or over one or more extended periods.

The present invention encompasses treatment of a patient by introducing a therapeutically effective number of cells, in particular immunomodulatory NK cells of the invention, into a subject's bloodstream. As used herein, "introducing" cells "into the subject's bloodstream" shall include, without limitation, introducing such cells into one of the subject's veins or arteries via injection. Such administering can also be performed, for example, once, a plurality of times, and/or over one or more extended periods. A single injection is preferred, but repeated injections over time (e.g., weekly, monthly, quarterly, half-yearly or yearly) may be necessary in some instances. Such administering is also preferably performed using an admixture of CD34-negative cells and a pharmaceutically acceptable carrier. Pharmaceutically acceptable carriers are well known to those skilled in the art and include, but are not limited to, 0.01-0.1 M and preferably 0.05 M phosphate buffer or 0.8% saline, as well as commonly used proprietary cryopreservation media. Administration may also occur locally, for example by injection into an area of the subject's body in proximity to the symptomatic organ or tissue.

Additionally, such pharmaceutically acceptable carriers can be aqueous or non-aqueous solutions, suspensions, and emulsions, most preferably aqueous solutions. Aqueous carriers include water, alcoholic/aqueous solutions, emulsions and suspensions, including saline and buffered media. Parenteral vehicles include sodium chloride solution, Ringer's dextrose, dextrose and sodium chloride, lactated Ringer's and fixed oils. Intravenous vehicles include fluid and nutrient replenishers, electrolyte replenishers such as Ringer's dextrose, those based on Ringer's dextrose, and the like. Fluids used commonly for i.v. administration are found, for example, in Remington: The Science and Practice of Pharmacy, 20th Ed., p. 808, Lippincott Williams S-Wilkins (2000). Preservatives and other additives may also be present, such as, for example, antimicrobials, antioxidants, chelating agents, inert gases, and the like.

In one embodiment, a therapeutically effective number of cells is administered. This may relate to either the NK cells of the invention or a therapeutic immune cell as the combined immune therapy. As used herein, a "therapeutically effective number of cells" includes, without limitation, the following amounts and ranges of amounts: (i) from about $1\times10^2$ to about $1\times10^8$ cells/kg body weight; (ii) from about $1\times10^3$ to about $1\times10^7$ cells/kg body weight; (iii) from about $1\times10^4$ to about $1\times10^6$ cells/kg body weight; (iv) from about $1\times10^4$ to about $1\times10^5$ cells/kg body weight; (v) from about $1\times10^5$ to about $1\times10^6$ cells/kg body weight; (vi) from about $5\times10^4$ to about $0.5\times10^5$ cells/kg body weight; (vii) about $1\times10^3$ cells/kg body weight; (viii) about $1\times10^4$ cells/kg body weight; (ix) about $5\times10^4$ cells/kg body weight; (x) about $1\times10^5$ cells/kg body weight; (xi) about $5\times10^5$ cells/kg body weight; (xii) about $1\times10^6$ cells/kg body weight; and (xiii) about $1\times10^7$ cells/kg body weight. Human body weights envisioned include, without limitation, about 5 kg, 10 kg, 15 kg, 30 kg, 50 kg, about 60 kg; about 70 kg; about 80 kg, about 90 kg; about 100 kg, about 120 kg and about 150 kg. These numbers are based on pre-clinical animal experiments and human trials and standard protocols from the transplantation of CD34+ hematopoietic stem cells. Mononuclear cells (including CD34+ cells) usually contain between 1:23000 to 1:300000 CD34-negative cells. These cell numbers may be applied for NK cells of the invention.

The instant disclosure also includes kits, packages and multi-container units and other materials of the herein described ECP systems and components thereof and material for performing the in vitro method and the method of treatment of the invention as well as for preparing and isolating the NK cells of the invention.

FIGURES

The invention is further described by the following figures. These are not intended to limit the scope of the invention, but represent preferred embodiments of aspects of the invention provided for greater illustration of the invention described herein.

Figure 1:
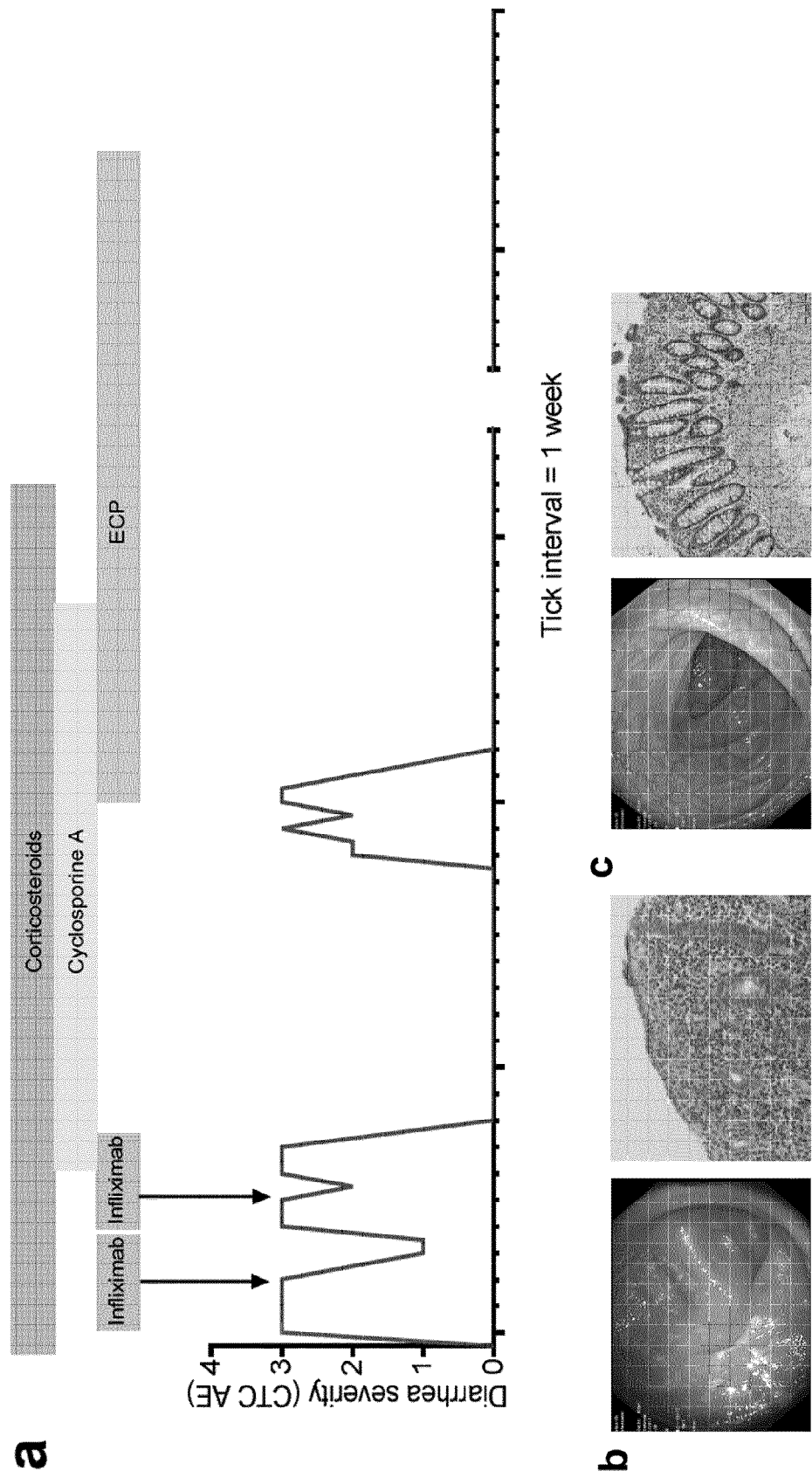
FIG. 1: Refractory autoimmune colitis responding to ECP which leads to the expansion of immunoregulatory NK cells.
  (a) The diarrhea severity of the patient according to common toxicity criteria (y-axis) over time (x-axis) with different treatments is shown.
  (b) Colonoscopy image (left panel) and H&E stained biopsy section (right panel) from the initial diagnosis of the immune checkpoint inhibitor-related colitis showing mucosal edema and ulcerations.
  (c) Colonoscopy image (left panel) and H&E stained biopsy section (right panel) after successful ECP treatment showing no signs of an autoimmune colitis. Colonic crypts show regular morphology without granulocytic infiltrations, apoptosis or crypt loss.
  (d) tSNE plot visualizing the peripheral lymphocyte compartment of the patient before and 8 weeks after start ECP.
  (e) Relative NK cell numbers before and after ECP treatment.
  (f) Expression intensity of CD16, CD56 and CD57 on NK cells (defined as single/live/$CD45^{pos}$/$CD14^{neg}$/$CD3^{neg}$/$CD19^{neg}$/$CD56^{pos}$) from healthy, age-matched donors (HD, n=5) and the patient at week 53 and week 75 after ECP start visualized by UMAP. FlowSOM clustered NK cell subsets are overlaid on the two plots on the right.
  (g) MFI (median marker expression, value range: 0-1) of CD16 on $CD56^{dim}$ mature NK cells. HD (n=5), whiskers of boxplot represent the minimum and maximum values of the HD dataset.
Figure 1:
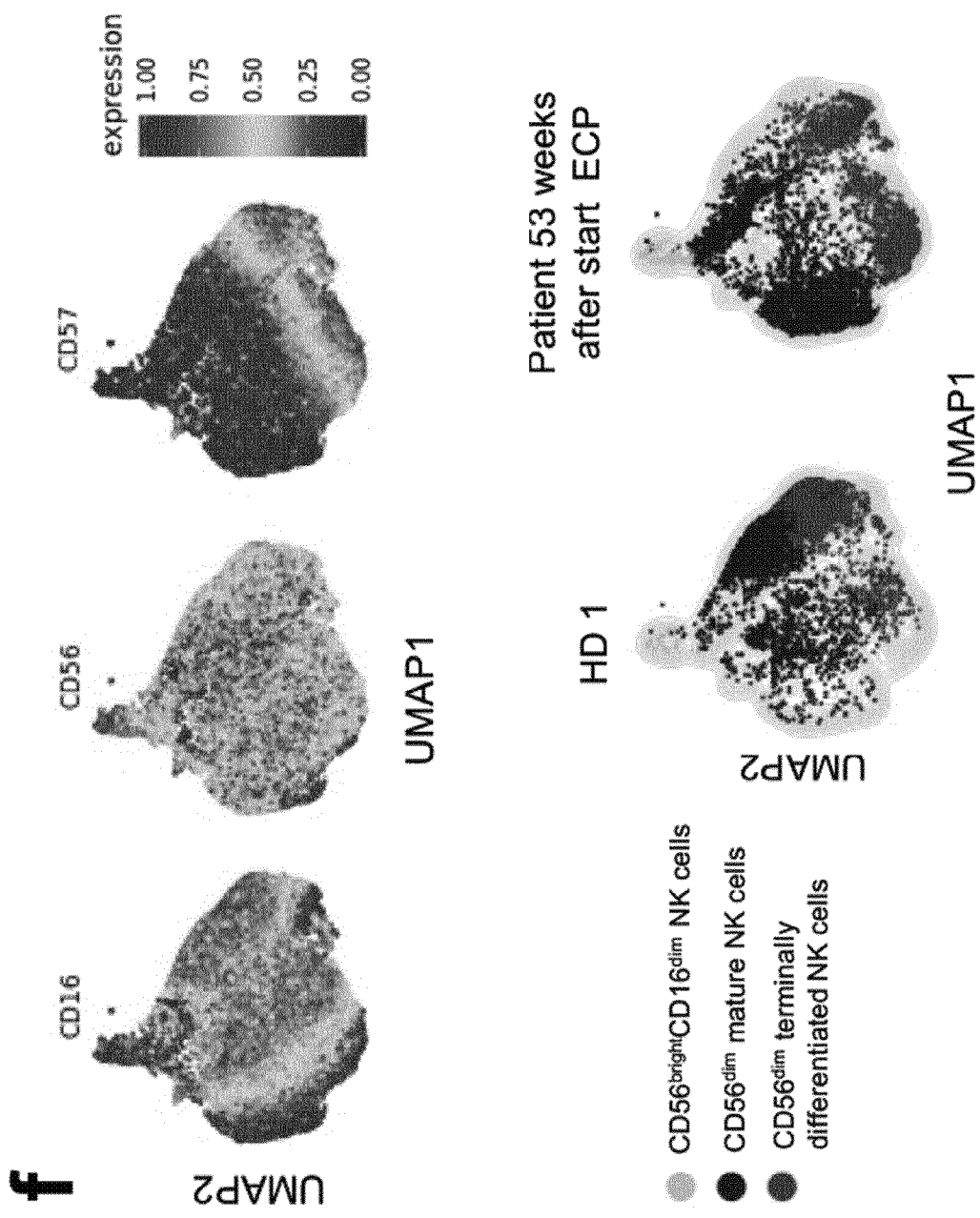
Figure 1:
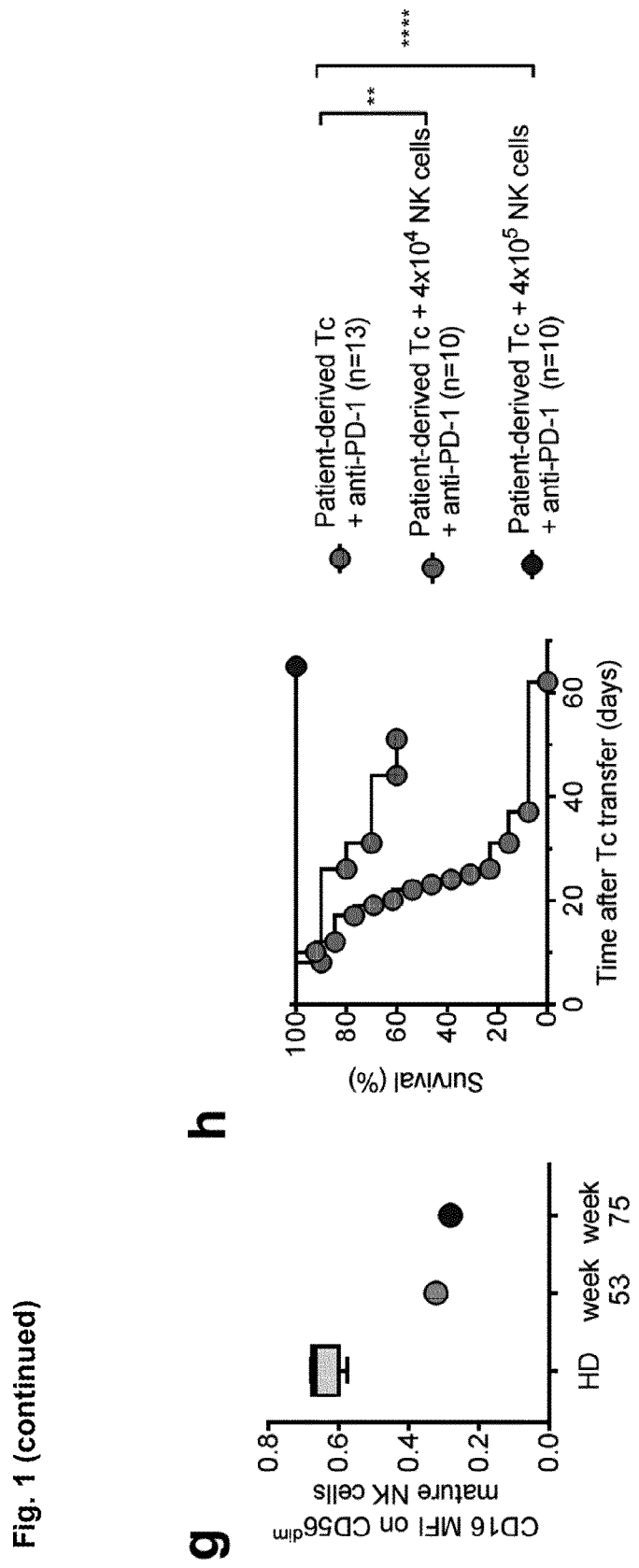
Figure 2:
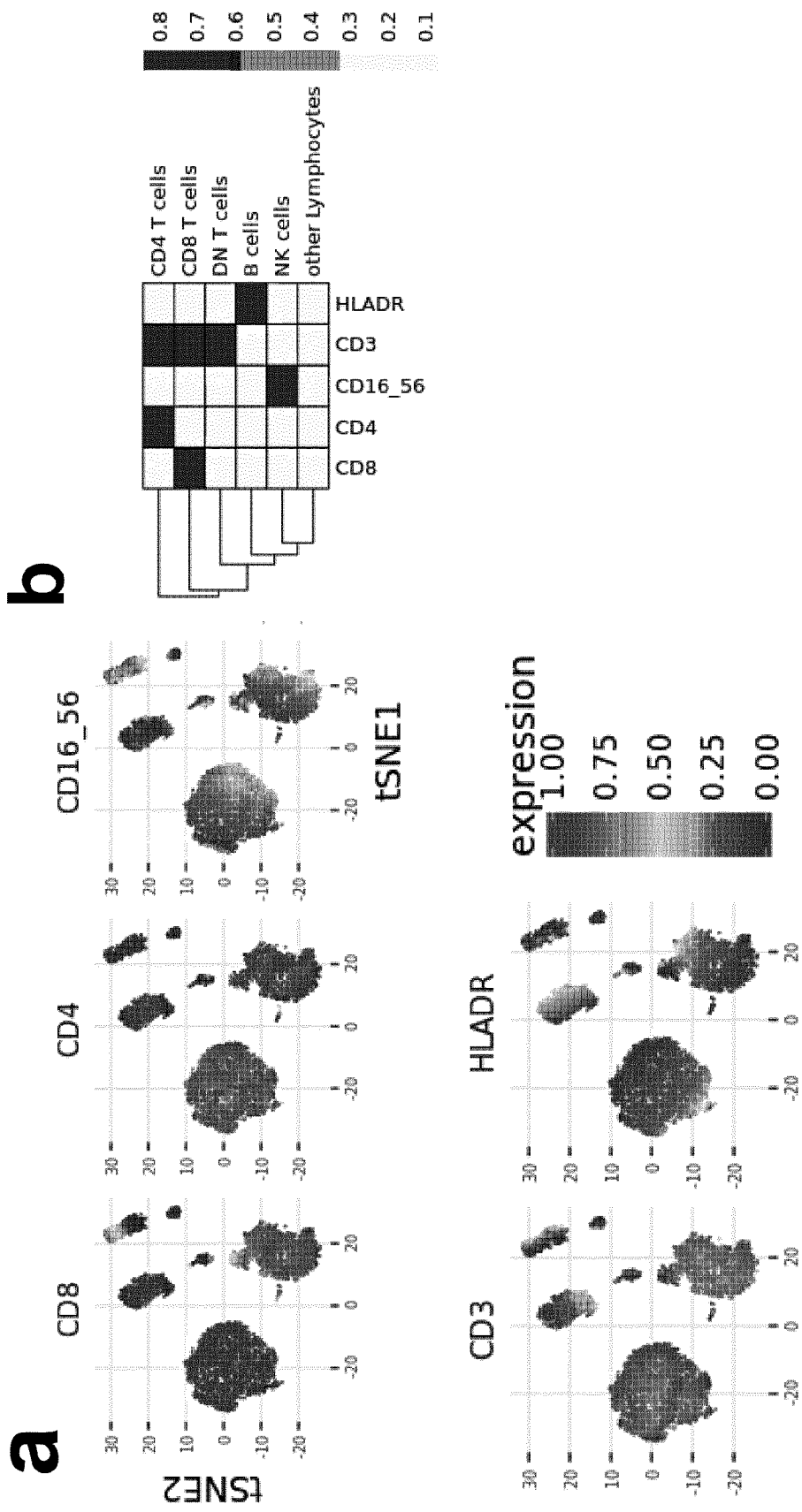
Figure 3:
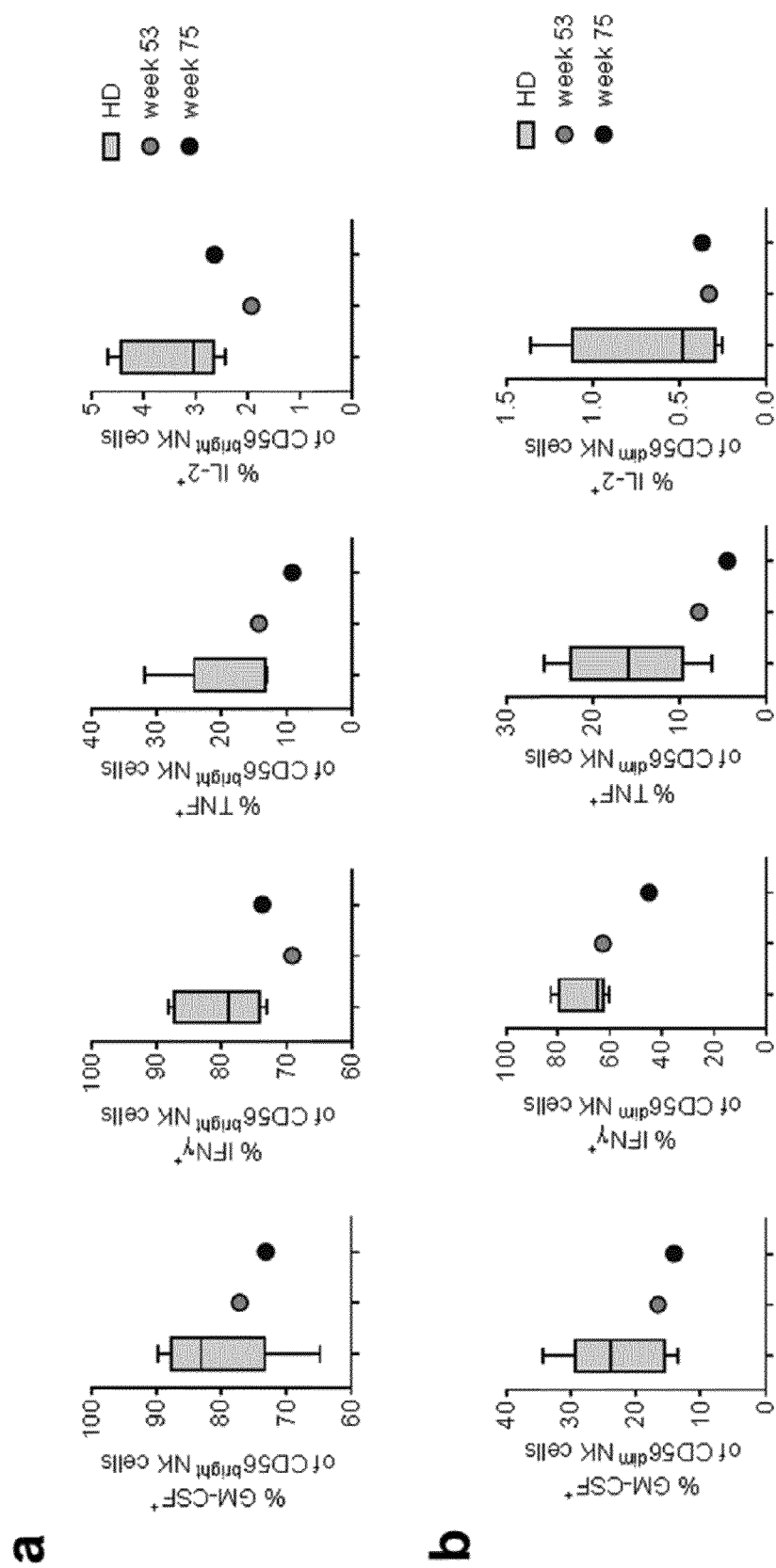
Figure 3:
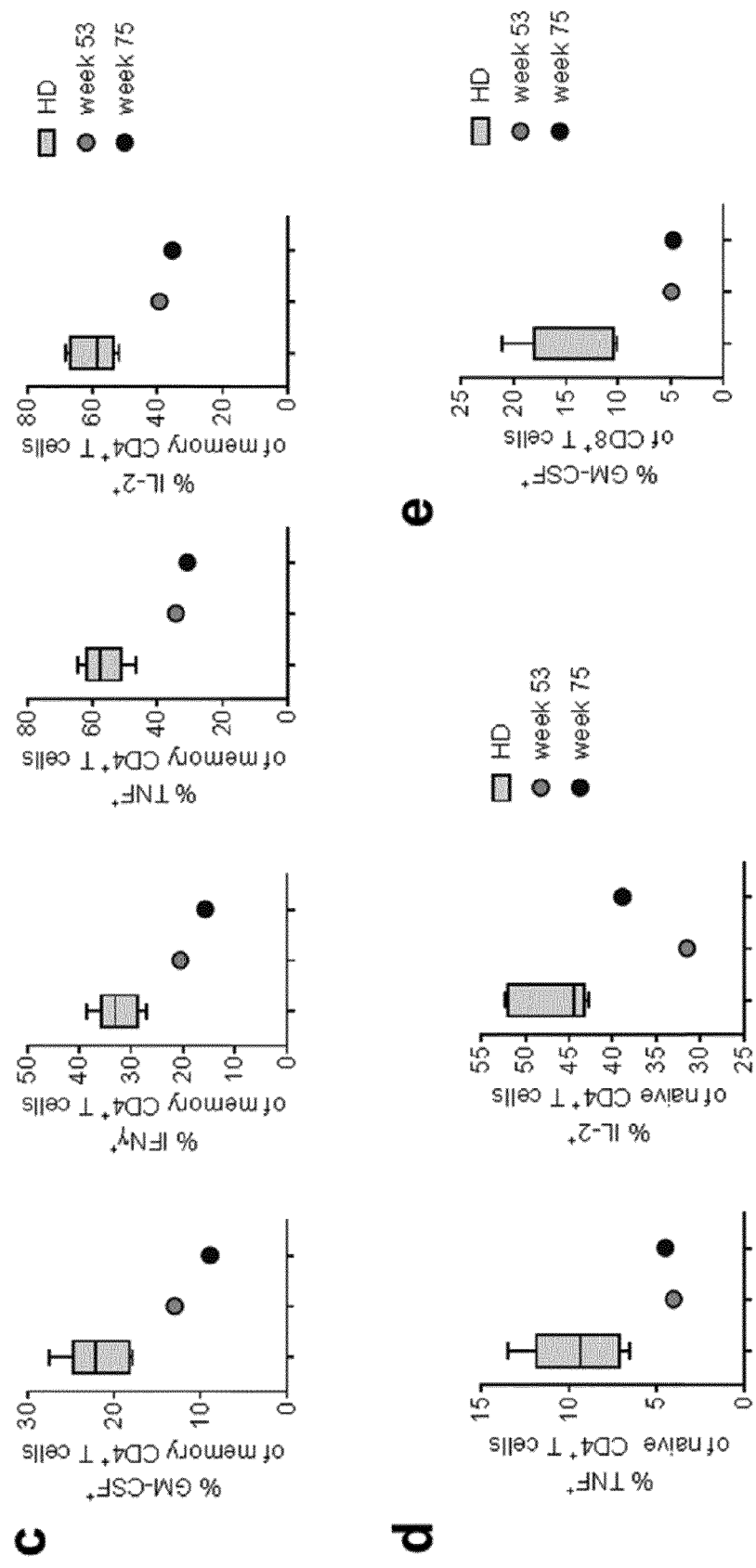

(h) Survival of mice injected with T cells (Tc) with or without NK cells (NK dose of $4 \times 10^4$ or $4 \times 10^5$ per mouse) in a model of anti-PD1 antibody-induced irAE as described in Suppl. Appendix. p=0.003, **p<0.0001.

FIG. 2:

(a) tSNE plot displaying 1000 stochastically selected CD45$^+$ lymphocytes (lymphocytes defined by FSC/SSC) of each time point with their expression of the indicated markers.
(b) Heatmap showing the median marker expression (value range: 0-1) for each annotated population.
(c) Absolute counts of NK cells before and after ECP treatment.
(d) Relative numbers of B cells, CD4$^+$ T cells, CD8$^+$ T cells and CD4$^-$ CD8$^-$ T cells before and after ECP treatment.
(e) Absolute counts of B cells, CD4$^+$ T cells, CD8$^+$ T cells and CD4$^-$ CD8$^-$ T cells before and after ECP treatment.
(f) Expression intensity of indicated markers on NK cells (defined as single/live/CD45$^{pos}$/CD14$^{neg}$/CD3$^{neg}$/CD19$^{neg}$/CD56$^{pos}$) from HD (n=5) and the patient at week 53 and week 75 visualized by UMAP.
(g) Heatmap showing the median marker expression (value range: 0-1) for the annotated NK cell subsets defined by FlowSOM clustering.
(h-j) MFI (median marker expression, value range: 0-1) of indicated markers on CD56$^{bright}$CD16$^{dim}$ immature NK cells, CD56$^{dim}$ mature NK cells and CD57$^{dim}$ terminally differentiated NK cells of healthy, age-matched donors (HD) and the patient (week 53 and week 75 after start ECP). HD (n=5), whiskers of boxplot represent the minimum and maximum values of the HD dataset.

FIG. 3:

(a)-(d) Percentage of cytokine-expressing cells within CD56$^{bright}$ NK cells, CD56$^{dim}$ NK cells, CD4$^+$ memory T cells, CD4$^+$ naïve cells and CD8$^+$ T cells of healthy, age-matched donors (HD) and the patient (week 53 and week 75 after start ECP). HD (n=5), whiskers of boxplot represent the minimum and maximum values of the HD dataset.

FIG. 4:

(a) Experimental model with adoptive transfer of patient T cells alone or along with NK cells into Rag2$^{-/-}$ Il2rg$^{-/-}$ mice and induction of immune-checkpoint inhibitor-associated autoimmunity by treatment with an anti-PD-1 antibody.
(b) Histopathological neutrophil and lymphocyte infiltration score of liver, skin, lung and colon isolated from Rag2$^{-/-}$Il2rg$^{-/-}$ mice on day 15 after patient T and NK cell injection as shown in (a).

FIG. 5:

(a) Treatment scheme of Rag2$^{-/-}$Il2rg$^{-/-}$ mice treated with an anti-PD-1 antibody without injection of patient-derived cells (negative control).
(b) Neutrophil infiltration score of liver, lung, skin and colon isolated from Rag2$^{-/-}$Il2rg$^{-/-}$ mice on day 15 after start of treatment as shown (a).
(c) Survival of Rag2$^{-/-}$Il2rg$^{-/-}$ mice treated as described in (a).

FIG. 6:

(a) Treatment schedule: Mice were treated with DSS (3%), anti-PD1 and ECP as indicated.
(b) Weight curve of mice that were untreated, or treated with DSS (3%), anti-PD1 alone or in combination with ECP as indicated.

(c) Colon length was quantified in 5 mice per group. Groups as indicated in panel B.
(d) Representative colon of one mouse per group. Groups as indicated in panel B.
(e) Representative HE stained section of the colon of groups as indicated in panel B.
(f) Histopathology scores of the colon of groups as indicated in panel B.

FIG. 7:

(a) Treatment schedule: Mice were injected iv with B16 melanoma cells and afterwards treated with anti-PD1, prednisolone or ECP as indicated.
(b) Survival of mice injected iv with B16 melanoma cells and afterwards treated with anti-PD1, prednisolone or ECP.

EXAMPLES

The invention is further described by the following examples. These are not intended to limit the scope of the invention, but represent preferred embodiments of aspects of the invention provided for greater illustration of the invention described herein.

We here report a patient suffering from ipilimumab/nivolumab-induced colitis, refractory to multiple immunosuppressive drugs, who achieved a complete response after extracorporeal photopheresis (ECP) coinciding with an expansion of immuno-regulatory natural killer (NK) cells.

Results of the Examples

A 29-year old male patient was treated with ipilimumab and nivolumab for metastatic melanoma. After two doses, the patient developed dermatitis, thyroiditis, hepatitis and colitis. Colitis was diagnosed based on macroscopic mucosal ulcerations and intraepithelial apoptosis and crypt loss identified in the biopsy (FIG. 1a,b). While dermatitis, thyroiditis and hepatitis resolved after stopping ipilimumab/nivolumab and corticosteroid treatment, the patient experienced three colitis episodes within the next 20 weeks (CTC-AE II-III°). These were treated with corticosteroids (in total 23 weeks prior to ECP), infliximab (2 single doses 18 and 15 weeks prior to ECP) and cyclosporine (14 weeks prior to ECP, FIG. 1a and Table 1).

Since there was no durable response, the patient received ECP. During the next 8 months, he underwent 2 cycles of ECP on consecutive days every 2-4 weeks. ECP was well tolerated and led to a complete response (FIG. 1a). Immunosuppression was tapered without symptom rebound. Continuous remission of colitis was confirmed by colonoscopy (FIG. 1c). Immune checkpoint-inhibitor treatment was discontinued upon first manifestation of irAE and never resumed.

Figure 4:
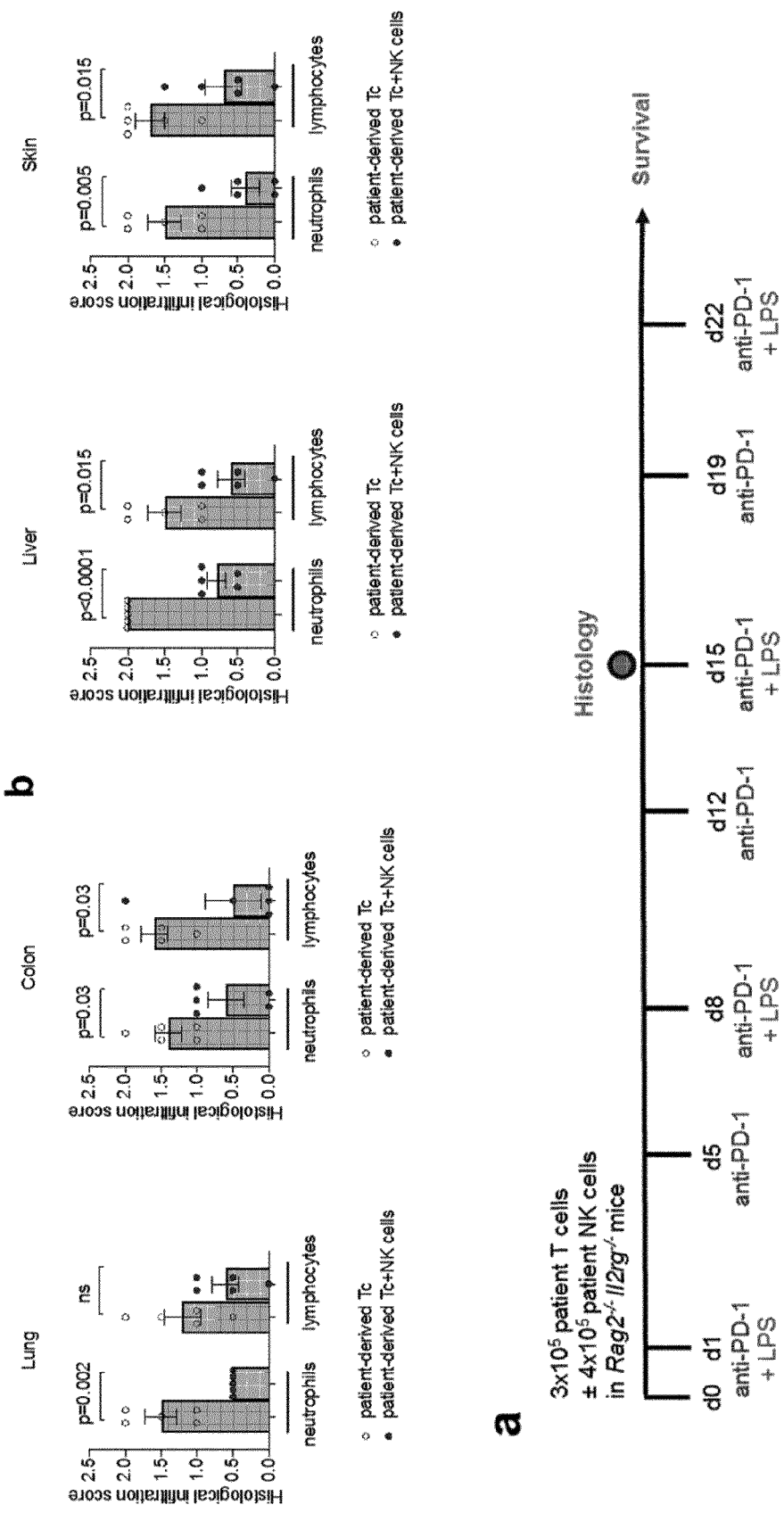
Figure 5:
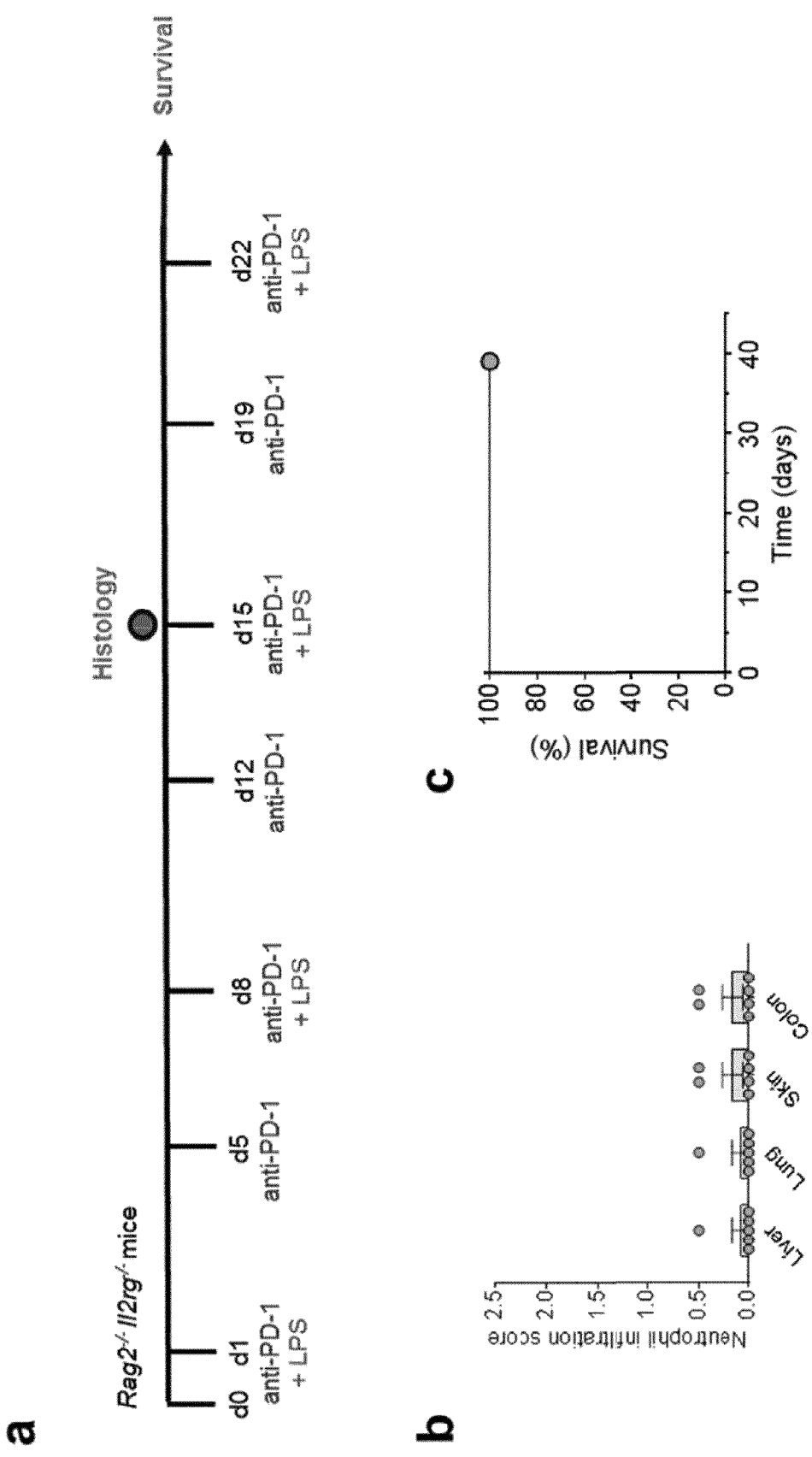

We analyzed the peripheral blood leukocyte compartment at multiple time points before and during ECP treatment. We observed a 4-fold increase in NK cells (FIG. 1d-e, FIG. 2a-j), with an immuno-regulatory phenotype (FIG. 1f,g). Also multiple pro-inflammatory cytokines were lower in the patient compared to age-matched healthy donors (FIG. 3a-e). Supporting the notion that NK cells regulated autoimmunity, adoptive transfer of the patient's NK cells prevented irAE in a murine irAE model triggered by human T cells and anti-PD-1 antibody-treatment in a dose-dependent manner (FIG. 1h and FIG. 4a,b). Control experiments confirmed that morbidity was mediated by the patient-derived T cells (FIG. 5).

ECP is an established therapy for the treatment of graft-versus-host disease (GVHD)[4] and leads to an increase of NK cells in GVHD patients[5]. Data regarding safety and efficacy of ECP for irAE treatment have been lacking so far. This case report implicates that ECP can be an efficient therapy for refractory checkpoint inhibitor-associated colitis through the expansion of a protective NK cell population.

Figure 6:
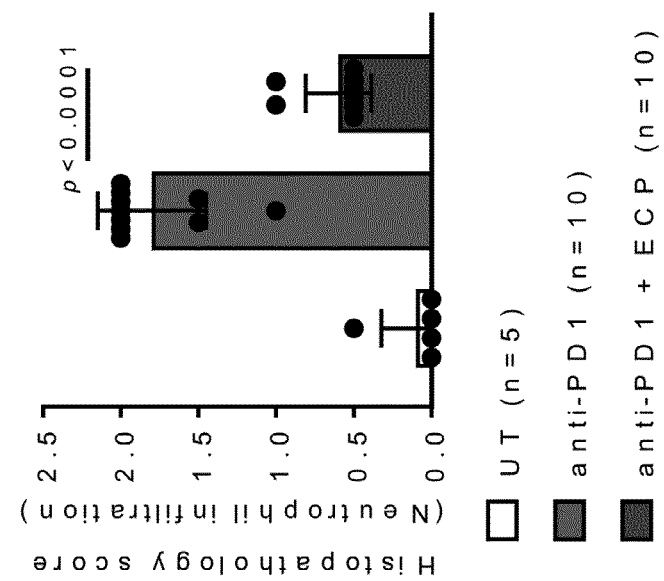
Figure 6:
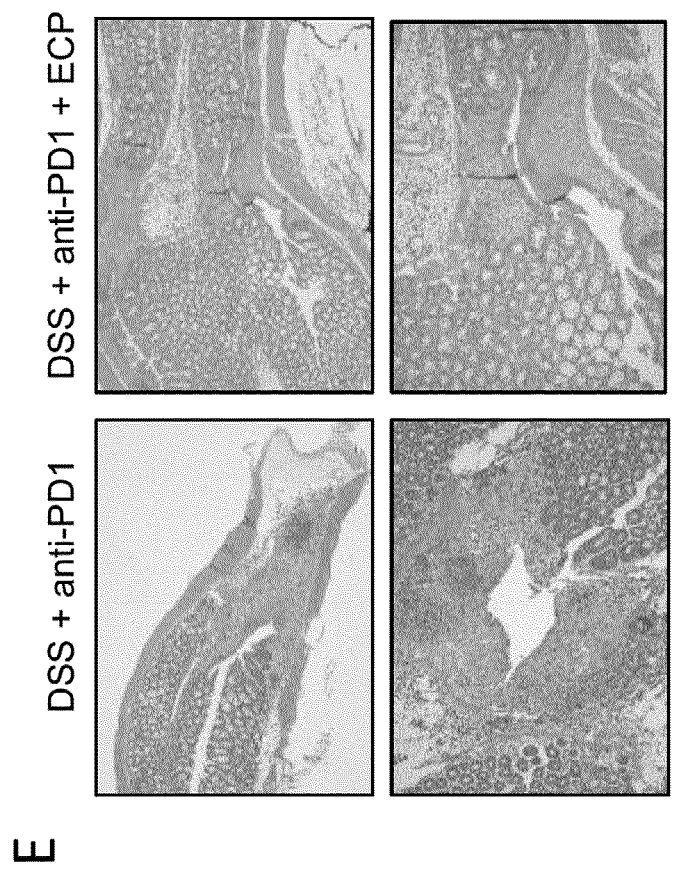

ECP Reduces Immune Mediated Adverse Events without Blocking the Anti-Melanoma Effect Based on the results presented above (FIGS. 1-5) showing that extracorporal photopheresis (ECP) reduced immune related colitis in a patient that had been treated with combined immunotherapy (nivolumab, ipilimumab) for metastatic melanoma, we next aimed to test this in an in vivo model for irAEs. To induce colitis, mice were treated with 3% DSS and anti-PD1 (FIG. 6A) according to previous reports (19). The treatment reduced the body weight of the mice consistent with the development of colitis and weight loss was reduced by ECP treatment (FIG. 6B). ECP treatment also increased colon length compared to the group treated with anti-PD1 only (FIG. 6C, D). Colon length was reported to be a surrogate parameter for the severity of the immunotherapy-induced colitis (19). In agreement with reduced colitis severity, we observed reduced infiltration of neutrophils in the colon wall of mice treated with ECP compared to the group treated with anti-PD1 only (FIG. 6E, F). These findings indicate that ECP reduces anti-PD1 induced colitis in mice.

Figure 7:
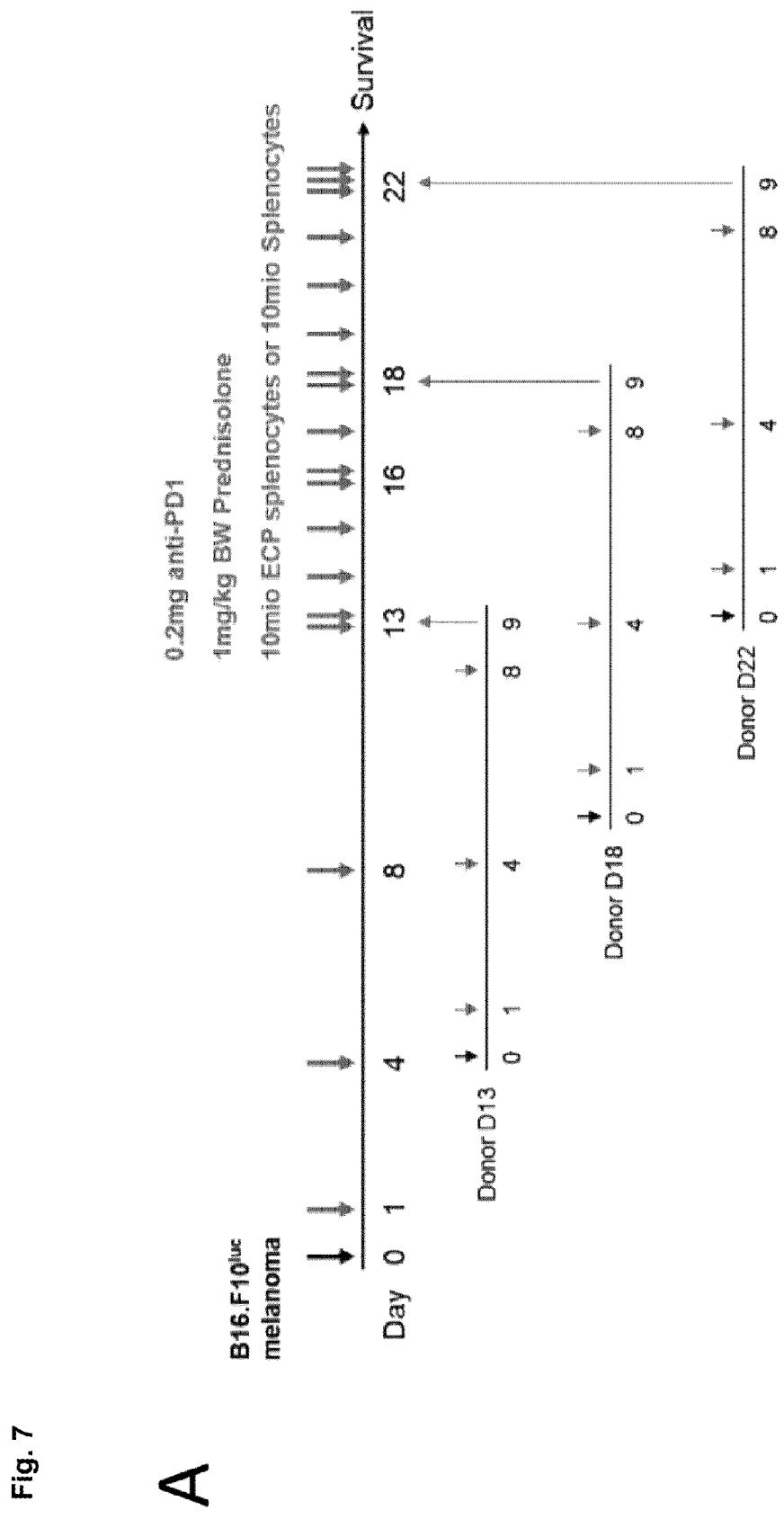

To understand if the immunomodulatory effect of ECP was connected to a loss of anti-tumor activity we next treated melanoma bearing mice with anti-PD1 alone or in combination with the glucocorticoid prednisolone or ECP (FIG. 7A). We observed that prednisolone reduced the survival of melanoma-bearing mice compared to the group treated with anti-PD1 only (FIG. 7B). In contrast, the group treated with anti-PD and ECP had a comparable outcome as the group treated with anti-PD1 only (FIG. 7B). These findings indicate that ECP does not interfere with the anti-melanoma response induced by anti-PD1 treatment.

Discussion of the Examples

Discussion of the mechanism: NK cells exert a variety of heterogenic immunological functions including anti-inflammatory activity. In a murine model of GVHD, transfer of NK cells improved survival, which was dependent on intact TGF-β signaling[6]. In another preclinical GVHD study, NK cells induced perforin and Fas ligand-mediated reduction of alloreactive T cell proliferation and increased T cell apoptosis[7]. A c-Kit$^-$ CD27$^-$ CD11 b$^+$ population was identified as a specific effector NK cell subset that was capable to control GVHD without interfering with the graft-versus-leukemia (GVL) effect[8]. In humans, killer cell immunoglobulin-like receptor (KIR) ligand mismatch in haploidentical allo-HCT in GVH direction reduced the risk for GVHD which was mediated by NK cells[9].

ECP is an efficient treatment for GVHD. An increase in NK cells during ECP for extensive chronic GVHD has been previously observed[10]. Patients with acute GVHD have a higher frequency of CD56$^{bri}$ NK subsets with stronger NKG2D and CD62L expression[11]. In the same study, CD56-CD16$^+$ NK cells with higher expression of CD57 and CD11 b were increased in patients with chronic cGVHD. ECP shifted the NK cell populations towards a more immuno-regulatory phenotype with protection of a specialized anti-viral and anti-leukemic CD57$^+$NKG2C$^+$CD56$^{dim}$ subset[11]. We hypothesize that similar mechanisms might be responsible for the protective effects of NK cells against irAE. When comparing the NK cell compartment in the patient with that of age- and sex-matched healthy controls, we observed a downregulation of CD16 expression, in particular on CD56$^{dim}$ NK cells. CD16 is the FcRγIII, an activating NK cell receptor that can induce strong cytokine production. Previous studies show that shedding of CD16 might be an immuno-regulatory mechanism to prevent autoimmunity[12]. CD16 downregulation modulates NK cell responses and contributes to maintenance of the immune homeostasis of both antibody and T cell-dependent pathways[13]. Supporting this hypothesis, expression of GM-CSF, IFN-γ, TNF and IL-2 was lower in the NK cells of the patient when compared to the control group.

Methods Employed in the Examples

ECP Procedure:

Extracorporeal photopheresis was performed on a Therakos CellEx photopheresis system with administration of Methoxsalen (Uvadex©). Two procedures were performed on consecutive days with 1500 ml blood being processed during each procedure. We collected all human samples after approval by the ethics committee of the Albert Ludwigs University, Freiburg, Germany (protocol number 300/16) and after written informed consent in accordance with the Declaration of Helsinki.

Murine Model of irAE

T cells were isolated from the patient's peripheral blood using negative selection with the Pan T cell isolation kit (Miltenyi Biotec) according to the manufacturer's instructions. NK cells were isolated from the patient's peripheral blood using the NK cell isolation kit, human (Miltenyi Biotec) according to the manufacturer's instructions. Rag2$^{-/-}$Il2rg$^{-/-}$ mice were injected intravenously with $3\times10^1$ T cells with or without $4\times10^4$ or $4\times10^1$ NK cells. From day 1 to day 22 after injection, mice were treated twice weekly with 8 mg/kg body weight anti-PD-1 antibody (clone J43) and once weekly with 1 mg/kg body weight LPS, both applied by an intraperitoneal injection (FIG. 4a). Sections of skin, liver, colon and lung collected on day 15 after human T cell injection were stained with hematoxylin-eosin and scored on the basis of histopathological characterization of human irAEs, including lymphocyte and neutrophil infiltration, crypt abscesses and apoptotic cells[14,15] by an experienced pathologist. All animal studies had been approved by the University institutional review board on the Use and Care of Laboratory Animals at the Albert-Ludwigs University Freiburg, Germany (Protocol approval numbers: G17-049, X13-07J, X15-10A).

Flow Cytometry

For monitoring of lymphocyte lineage populations during and after ECP therapy, peripheral blood lymphocytes of the patient were isolated and stained with a standardized panel of antibodies against CD45, CD19, CD3, CD4, CD8, CD16, CD56 and HLA-DR as a part of the routine diagnostics. Data was compensated in FlowJo (V10), lymphocytes were exported and using the R environment[17]. tSNE and FlowSOM clustering were performed as previously described[16].

For multiparametric NK cell phenotypisation and cytokine analysis peripheral blood lymphocytes were isolated using density gradient medium (Lymphoprep, STEMCELL Technologies) according to the manufacturer's instructions. Thawed peripheral blood lymphocytes were stained with antibodies listed in Table S2. Zombie Aqua Fixable Viability kit (Biolegend) was used for live/dead discrimination. For production of cytokines, cells were stimulated with 50 ng/ml PMA (Axon Lab) and 500 mg/ml Ionomycin (Sigma) in the presence of GolgiPlug (BD Biosciences) for 4 h. Intracellular staining was performed using the BD Cytofix/Cytoperm kit (BD Biosciences) according to the manufacturer's protocol. Data was acquired on an Aurora flow cytometer (Cytek) and compensated using FlowJo (Flowjo V10.6.1, LLC) software. Cell populations specified in the figures were exported and analyzed using the R environment[17]. Data was processed for FlowSOM clustering as described[16]. For dimensionality reduction the UMAP package was used[18].

Statistics

Statistical analysis was performed using the GraphPad Prism Lab Software V7.0. Comparisons of two groups were performed by two-tailed unpaired Student's t tests. Differences in survival (Kaplan-Meier survival curves) were evaluated using the Mantel Cox (log-rank) test. Data are presented as mean±SEM if not otherwise indicated. A p-value <0.05 was considered to be significant.

Tables of the Examples

TABLE 1

Disease and treatment course.

| Episode | Time point prior to ECP (weeks) | Maximal diarrhea severity (CTC-AE) | Treatment at the beginning of the episode | New treatment added during the episode |
|---|---|---|---|---|
| 1 | 20 | 3 | Methylprednisolon 0.3 mg/kg BW (previously given for autoimmune hepatitis) | Methylprednisolon 2 mg/kg BW Infliximab 5 mg/kg BW |
| 2 | 16 | 3 | Methylprednisolon 0.1 mg/kg BW | Prednison 1 mg/kg BW Infliximab 5 mg/kg BW Cyclosporine A 3 mg/kg BW |
| 3 | 2 | 3 | Cyclosporine A 1.25 mg/kg BW Prednison 7.5 mg abs | ECP |

The patient had his first episode of colitis 20 weeks prior to the start of ECP. At that time point he had been treated for 3 weeks with steroids for his previous immune checkpoint inhibitor-related hepatitis, thyroiditis and dermatitis. The colitis occurred during tapering of the steroids. Therefore, the steroid dose was increased and due to an insufficient response, infliximab 5 mg/kg BW was administered once. The symptoms resolved. Upon steroid tapering, the patient experienced his second episode of colitis, 16 weeks prior to begin of ECP. He was treated with an increased dose of methylprednisolone and a second dose of infliximab. The diarrhea was refractory to this therapy and consequently cyclosporine A was added. The symptoms resolved again. As the cyclosporine A dose was reduced, the patient had a third episode of colitis. Here, ECP treatment was initiated. Two weeks after ECP start, the patient had normal bowel movement frequency. Cyclosporine A treatment was discontinued 8 weeks after ECP start, corticosteroid treatment was discontinued 12 weeks after ECP start without any symptom rebound. ECP was performed for a total of 32 weeks. With a follow-up of 11 months after the last ECP, the patient remained in complete remission with respect to both, the irAE and the melanoma manifestation.

TABLE 2

Antibodies used for flow cytometry with human cells.

| Antigen | Flurochrome | Clone | Manufacturer |
|---|---|---|---|
| CD16 | BUV495 | 3G | BD |
| CD14 | BUV563 | M5E2 | BD |
| CD45RO | BUV615 | UCHL1 | BD |
| CD3 | BUV661 | UCHT1 | BD |
| CD45 | BUV805 | HI-30 | BD |
| NKp46 | BV421 | 9E2 | Biolegend |
| CD56 | BV480 | NCAM16.2 | BD |
| CD8 | BV570 | RPA-T8 | Biolegend |
| CD4 | BV711 | OKT4 | Biolegend |
| CD4 | APC-Cy7 | RPA-T4 | BD |
| CD94 | BV786 | HP-3D9 | IBD |
| CD57 | PerCP-Cy5.5 | HNK-1 | Biolegend |
| TIGIT | PE | MBSA43 | eBioscience |
| CD62L | PE-Cy5 | DREG-56 | BD |
| KLRG1 | PE-Cy7 | 13F12F2 | ThermoScientific |
| NKG2D | APC | 1D11 | Biolegend |
| NKG2C | AF488 | 134591 | R&D |
| CD19 | BUV737 | SJ25C1 | BD |
| CD19 | APC-Vio770 | REA675 | Miltenyi |
| IL-2 | BV711 | MQ1-17H12 | Biolegend |
| TNF | BV785 | Mab11 | Biolegend |
| IFN gamma | PE-Cy7 | 4S.B3 | eBioscience |
| GM-CSF | PE | BVD2-21C11 | BD |

REFERENCES

1. Larkin J, Chiarion-Sileni V, Gonzalez R, et al. Combined Nivolumab and Ipilimumab or Monotherapy in Untreated Melanoma. N Engl J Med 2015; 373:23-34.
2. Wolchok J D, Chiarion-Sileni V, Gonzalez R, et al. Overall Survival with Combined Nivolumab and Ipilimumab in Advanced Melanoma. N Engl J Med 2017; 377:1345-56.
3. Postow M A, Chesney J, Pavlick A C, et al. Nivolumab and ipilimumab versus ipilimumab in untreated melanoma. N Engl J Med 2015; 372:2006-17.
4. Zeiser R, Blazar B R. Acute Graft-versus-Host Disease—Biologic Process, Prevention, and Therapy. N Engl J Med; 2017; 377:2167-79.
5. Ni M, Wang L, Yang M, et al. Shaping of CD56(bri) Natural Killer Cells in Patients With Steroid-Refractory/Resistant Acute Graft-vs.-Host Disease via Extracorporeal Photopheresis. Front Immunol 2019; 10:547.
6. Asai O, Longo D L, Tian Z G, et al. Suppression of graft-versus-host disease and amplification of graft-versus-tumor effects by activated natural killer cells after allogeneic bone marrow transplantation. J Clin Invest 1998; 101:1835-42.
7. Olson J A, Leveson-Gower D B, Gill S, Baker J, Beilhack A, Negrin R S. NK cells mediate reduction of GVHD by inhibiting activated, alloreactive T cells while retaining GVT effects. Blood 2010; 115:4293-301.
8. Meinhardt K, Kroeger I, Bauer R, et al. Identification and characterization of the specific murine NK cell subset supporting graft-versus-leukemia- and reducing graft-versus-host-effects. Oncoimmunology 2015; 4:e981483.
9. Ruggeri L, Capanni M, Urbani E, et al. Effectiveness of donor natural killer cell alloreactivity in mismatched hematopoietic transplants. Science 2002; 295:2097-100.
10. Alcindor T, Gorgun G, Miller K B, et al. Immunomodulatory effects of extracorporeal photochemotherapy in patients with extensive chronic graft-versus-host disease. Blood 2001; 98:1622-5.
11. Ni M, Wang L, Yang M, et al. Shaping of CD56(bri) Natural Killer Cells in Patients With Steroid-Refractory/

Resistant Acute Graft-vs.-Host Disease via Extracorporeal Photopheresis. Front Immunol 2019; 10:547.
12. Romee R, Foley B, Lenvik T, et al. NK cell CD16 surface expression and function is regulated by a disintegrin and metalloprotease-17 (ADAM17). Blood 2013; 121:3599-608.
13. Goodier M R, Lusa C, Sherratt S, Rodriguez-Galan A, Behrens R, Riley E M. Sustained Immune Complex-Mediated Reduction in CD16 Expression after Vaccination Regulates NK Cell Function. Front Immunol 2016; 7:384.
14. Beck K E, Blansfield J A, Tran K Q, et al. Enterocolitis in patients with cancer after antibody blockade of cytotoxic T-lymphocyte-associated antigen 4. J Clin Oncol 2006; 24:2283-9.
15. Johncilla M, Misdraji J, Pratt D S, et al. Ipilimumab-associated Hepatitis: Clinicopathologic Characterization in a Series of 11 Cases. Am J Surg Pathol 2015; 39:1075-84.
16. Brummelman J, Haftmann C, Nunez N G, et al. Development, application and computational analysis of high-dimensional fluorescent antibody panels for single-cell flow cytometry. Nat Protoc 2019; 14:1946-69.
17. Team R D C. A language and Environment for Statistical Computing. R Foundation for Statistical Computing 2010.
18. Mcinnes L, Healy J, Melville J. UMAP: Uniform Manifold Approximation and Projection for Dimension Reduction. arXiv 6, 03426v03422 (2018).
19. Perez-Ruiz E, Minute L, Otano I, Alvarez M, et al. Prophylactic TNF blockade uncouples efficacy and toxicity in dual CTLA-4 and PD-1 immunotherapy. Nature. 2019 May; 569(7756):428-432.

The invention claimed is:

1. A method comprising the steps of:
providing a sample derived from a blood sample of a subject that (i) suffers from cancer, (ii) is concurrently receiving an immunosuppressive drug and/or is refractory to immunosuppressive drugs, (iii) is receiving a checkpoint-inhibitor therapy, and (iv) is suspected of developing or has developed symptoms of immune-related adverse events (irAE) comprising autoimmune colitis;
adding a photosensitizing agent to the sample;
subjecting the sample to irradiation to generate or induce the formation of immunoregulatory NK cells in the sample; and
administering the NK cells to the subject while checkpoint-inhibitor therapy is ongoing,
wherein the NK cells are autologous with respect to the subject.

2. The method according to claim 1, wherein the photosensitizing agent is 8-methoxypsoralen and/or the irradiation is UVA irradiation.

3. The method according to claim 1, wherein the subject shows symptoms of or suffers from irAE.

4. The method according to claim 1, wherein the cancer is a malignant melanoma or another cancer treatable by checkpoint-inhibitor therapy.

5. The method according to claim 1, wherein the subject is concurrently receiving an immunosuppressive drug, and the immunosuppressive drug is selected from the group consisting of a steroid, a corticosteroid, a cyclosporine an anti-TNF antibody, and combinations thereof.

6. The method according to claim 5, wherein the anti-TNF antibody is infliximab.

7. The method according to claim 1, wherein the checkpoint-inhibitor therapy comprises administration of at least one of anti-CTLA4 antibodies and anti-PD-1 antibodies.

8. A method for treating a subject in need thereof that is receiving or has received a checkpoint-inhibitor therapy and shows symptoms of or suffers from irAE comprising autoimmune colitis, comprising:
subjecting the subject in need thereof to extracorporeal photopheresis therapy (ECP).

9. The method according to claim 8, wherein ECP comprises collecting a sample derived from a blood sample of the subject in need thereof.

10. The method according to claim 9, wherein ECP further comprises adding a photosensitizing agent to the sample.

11. The method according to claim 10, wherein ECP further comprises subjecting the sample to irradiation.

12. The method according to claim 11, wherein adding the photosensitizing agent to the sample and subjecting the sample to irradiation generates or induces the formation of immunoregulatory NK cells in the sample.

13. The method according to claim 12, wherein the irradiation is UVA irradiation.

14. The method according to claim 10, wherein the photosensitizing agent is 8-methoxypsoralen.

15. The method according to claim 8, wherein the subject in need thereof suffers from malignant melanoma or another cancer treatable by checkpoint-inhibitor therapy.

16. The method according to claim 8, wherein the checkpoint-inhibitor therapy was discontinued after symptoms of irAE occurred in the subject.

17. The method according to claim 8, wherein symptoms of irAE occurred after the checkpoint-inhibitor therapy was discontinued.

18. The method according to claim 8, wherein symptoms of irAE were maintained after the checkpoint-inhibitor therapy was discontinued.

19. The method according to claim 8, wherein the subject is concurrently receiving an immunosuppressive drug and/or is refractory to immunosuppressive drugs.

20. The method according to claim 19, wherein the immunosuppressive drug is selected from the group consisting of a steroid, a corticosteroid, a cyclosporine, an anti-TNF antibody, and combinations thereof.

* * * * *